US006625311B1

United States Patent
Zhu

(10) Patent No.: US 6,625,311 B1
(45) Date of Patent: *Sep. 23, 2003

(54) METHODOLOGY FOR DATA STRUCTURE CHARACTERIZATION, INDEXING, STORAGE AND RETRIEVAL

(75) Inventor: Qiuming Zhu, Omaha, NE (US)

(73) Assignee: The Board of Regents of the University of Nebraska, Lincoln, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/907,691

(22) Filed: Jul. 19, 2001

Related U.S. Application Data

(63) Continuation-in-part of application No. 09/287,961, filed on Apr. 9, 1999, and a continuation-in-part of application No. 09/436,541, filed on Nov. 8, 1999.

(51) Int. Cl.[7] .................................................. G06K 9/34
(52) U.S. Cl. .................................... 382/173; 382/305
(58) Field of Search ................................. 382/173, 190, 382/220, 224, 276, 277, 289, 295, 296, 100, 128, 132, 133; 348/607; 345/418, 427; 707/2

(56) References Cited

U.S. PATENT DOCUMENTS

| 4,742,558 A | 5/1988 | Ishibashi et al. ............. 382/56 |
| 4,849,914 A | 7/1989 | Medioni et al. ............ 366/526 |
| 4,896,364 A | 1/1990 | Lohscheller ................. 382/22 |
| 5,572,726 A | 11/1996 | Hasuo ........................ 395/616 |
| 5,586,197 A | 12/1996 | Tsujimura et al. .......... 382/162 |
| 5,608,862 A | 3/1997 | Enokida ..................... 395/501 |
| 5,644,765 A | 7/1997 | Shimura et al. |
| 5,748,777 A | 5/1998 | Katayama et al. .......... 382/199 |
| 5,790,269 A | 8/1998 | Masaki et al. .............. 358/447 |
| 5,841,891 A | 11/1998 | Windig et al. .............. 382/131 |
| 5,889,882 A | 3/1999 | Senn et al. ................. 382/132 |
| 5,892,732 A | 4/1999 | Gersztenkorn ............... 367/72 |
| 5,902,987 A | 5/1999 | Coffman et al. ........ 235/462.12 |
| 5,930,391 A | 7/1999 | Kinjo ......................... 382/173 |
| 6,049,623 A | 4/2000 | Fuderer et al. ............. 382/131 |
| 6,134,541 A | 10/2000 | Castelli et al. ................. 707/2 |
| 6,229,578 B1 * | 5/2001 | Acharya et al. ............ 348/607 |

* cited by examiner

Primary Examiner—Bhavesh M. Mehta
Assistant Examiner—Kanji Patel
(74) Attorney, Agent, or Firm—James D. Welch

(57) ABSTRACT

Disclosed is a method for enabling easy characterization, storage and retrieval of multi-dimensional data structures involving use of a translation, rotation and scaling invariant index which results from concatenating a series of Eigenvalue calculation mediated index elements determined at a plurality of hierarchical data depth levels by characterizing spatial first and second central moment calculations, optionally including pre-selection of pixels in data structures which demonstrate significant intensity and/or color gradients with respect to surrounding pixels. Preferred characterizing vector(s) consist of typically orthogonally specific frequency integer counts of said pre-selected pixels, as well as spatial data structure first central monent value(s), and non-degenerate parameters determined from Eigenvalues derived from second central moments.

36 Claims, 4 Drawing Sheets

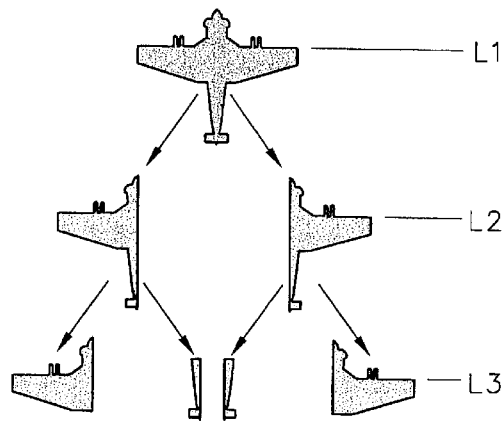
FIG. 1
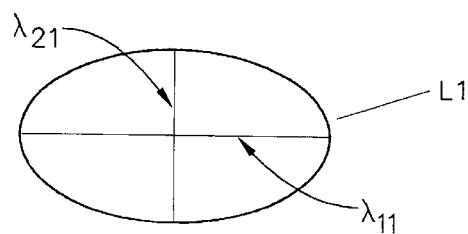
FIG. 2a
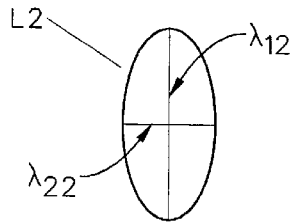 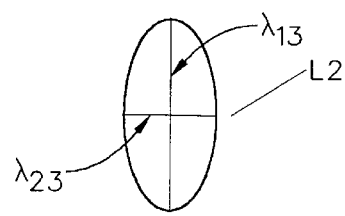
FIG. 2b₁         FIG. 2b₂
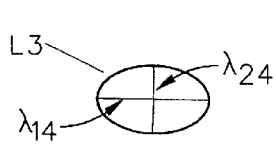 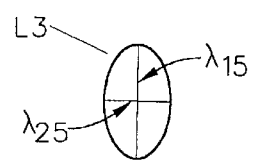 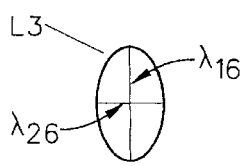 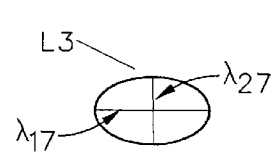
FIG. 2c₁     FIG. 2c₂     FIG. 2c₃     FIG. 2c₄

A.
Determining Eigenvalues for an (N) dimensional data set, said Eigenvalues being a major axis and (N-1) minor axes of a characteristic virtual data set mathematical object, then calculating a first non-degenerate data set index element using a formula which operates on said major axis and at least one of said (N-1) minor axes.

B.
dividing said essentially entire "N" dimensional data set into at least first and second data set parts about at least one axis selected from the group consisting of: (said major axis and said (N-1) minor axes), and for at least one of said at least first and second data set parts independently determining "N" Eigenvalues therefore, said "N" Eigenvalues being a major axis and (N-1) minor axes of a mathematical object for said at least one of said at least first and second data set parts, and then calculating at least one additional non-degenerate data set index element using formula(s) which operate on said major axis and at least one of said (N-1) minor axes in said at least one of said at least first and second data set parts, and return a non-degenerate result, and concatenating at least two resulting non-degenerate data set index elements in any functional order to provide said identifying data set index (I).

CONCATENATE

C.
comparing said resulting data set index (I) to data image indices for data sets for which data set indicies have been previously determined.

FIG. 4

METHODOLOGY FOR DATA STRUCTURE CHARACTERIZATION, INDEXING, STORAGE AND RETRIEVAL

This application is a continuation-in-part of Ser. No. 09/287,961 filed on Apr. 9, 1999 and a continuation-in-part of Ser. No. 436,541 filed on Nov. 8, 1999.

TECHNICAL FIELD

The present invention relates generally to methods of data structure characterization, indexing, storage and retrieval; and more particularly comprises a method for enabling easy characterization, storage and retrieval of multi-dimensional data structures involving use of a translation, rotation and scaling invariant index which results from concatenating a series of Eigenvalue calculation mediated index elements determined at a plurality of hierarchical data depth levels. A variation thereof pre-selects pixels in data structures which have associated therewith significant intensity and/or color gradient(s) with respect to surrounding pixels, in, for instance, "X" and/or "Y" and/or "Z" direction(s), then utilizes said pre-selected pixels in the data structure characterizing spatial first and second central moment calculations. Data structure characterizing vector(s) are constructed from spatial data structure first central moment values, and non-degenerate parameter(s) determined from second central moment calculations, as well as from, when applicable, frequency-of-occurance integer counts of said pre-selected pixels.

BACKGROUND

Data structures, such as two dimensional pixel arrays, are being generated at an ever increasing rate. For instance, algorithm generated and scanned computer screen images, X-ray, CT, MRI and NASA satellite, space telescope and solar explorer systems generate thousands of images every day. To make optimum use of said images, however, convenient methods of data characterization, storage and retrieval are required. For example, a medical doctor might obtain an X-ray image of a patient's chest but has to rely on "diagnostic art" to arrive at a diagnosis. Were it possible to determine an index which characterizes said X-ray image and also enable easy storage and retrieval thereof, it would be possible to compare said index to a catalog of indices of various X-ray images which are known to be associated, with various healthy or pathologic conditions. Thus diagnosis could be moved toward the very desirable goal of being objectively definite in a mathematical sense.

Continuing, it must be understood that conventional data bases are stored as text with organization being in terms of fields and values. Examples are business product, customer lists, sales data etc. To retrieve such data a user must issue a query in text format, similar to what is done in natural languages. It is essentially impossible to use such an approach to store and retrieve the contents of most data images, for example, because there is no convenient manageable way to describe such data images in terms of said fields and values. Data Images are instead typically stored in the form of compressed digital files of hundreds of thousands of binary numbers, and said storage technique does not facilitate easy image characterization, storage and retrieval. And, while it is possible to describe a data image with a text Index, to examine the data image still requires that the data associated with said Index be retrieved. It is also possible to assign an arbitrary serial number to a data image to facilitate data storage and retrieval, but under this approach the serial number provides no insight to the image and again, to examine data image, requires accessing the image data per se.

A preferred approach to the characterization of data images, which provides an index for use in storage and retrieval thereof, is to base the index on features in the data image. To arrive at such an index, however, is typically computationally complex, requiring hundreds of thousands of calculations. That is, determination of said index must typically be extracted from a data image "off-line". Characteristic indices so determined are called "image indices", and ideally render a concise description, not only of an image color and intensity content on a row and column basis, but also of the nature and shape of objects therein. A problem arises, however, in that many image features can not be easily described. Geometric shapes in a data image, for example, can require a combination of text annotation and numeric values and often the result is not at all concise.

Continuing, it must be understood that conventional data are stored as text, with organization being in terms of alphebetic and numerical value fields. Examples are business product, customer lists, sales data etc. To retrieve such data a user must issue a query text format, similar to what is done in natural languages. It is, however, essentially impossible to use such an approach to store and retrieve the contents of most data structures, (two dimensional picture graphic data images for example), because there is no convenient manageable way to describe such data structures in terms of said alphabetic and numerical value fields. Data Structures are instead typically stored in the form of compressed digital files of hundreds of thousands of binary numbers, and said storage technique does not facilitate easy data structure indexing, characterization, storage and retrieval. And, while it is possible to describe a data structure with a text Index, to examine the data structure data still requires that the data associated with said index be retrieved. It is also possible to assign an arbitrary serial number to a data structure to facilitate data storage and retrieval, but under this approach the serial number provides no insight to the data, and again, to examine data structure, requires accessing the data per se.

A preferred approach to the characterization of data structures, which provides an index for use in storage and retrieval thereof, is to base the index on features in the data structure. To arrive at such an index, however, is typically computationally complex, requiring hundreds of thousands of calculations. That is, determination of said index must typically be extracted from a data structure "off-line". Characteristic indices so determined are called "structure indices", and ideally render a concise description, not only of a structure color and intensity content on a row and column basis, but also of the nature and shape of objects therein. A problem arises, however, in that many data structure features can not be easily described. Geometric shapes in a data structures, for example, can require a combination of text annotation and numeric values and often the result is not at all concise.

Relevant considerations in developing an approach to extracting "image indices" from a data image or data structure include:

1. Uniqueness—different images/data structures should have different associated indices, (ie. an image index should be non-degenerate);
2. Universality—image/data structure indices must be extractable from essentially any kind of image to be characterized, stored and retrieved by use thereof;

3. Computation—image/data structure indices must be easily computed from any data structure to be characterized, stored and retrieved by use thereof, and computation complexity should be kept to a minimum possible;

4. Conciseness—image/data structure indices must concise and easy to store;

5. Invariance—descriptive features in an image/data structure must tolerate change of scale, rotation and translation transformations, image object position shifting, calibration of color and pixel intensity and return essentially unchanged image indices;

6. Noise resistant—random noise entry to image/data structure should not significantly change the image index extracted therefrom.

Previous attempts at extracting an index for an image/data structure have focused on use of:

pixel intensity and color distributions, (see an article titled "Query By Image And Video Content: The QBIC System"), IEEE Trans. on Computers, (Sep. 1995));

pixel texture patterns (see a book titled "Digital Image Processing", Gonzales, Addison-Wesley Pub. (1992)); and edge and boundary-line shapes, (see a book titled "Digital Image Processing And Computer Vision", Schalkoff, John Wiley & Sons, (1989)), etc. as the basis of approach. These techniques are mainly based on the calculation of the statistics of a data image in a pixel arrangement. Said techniques often lack universality in that they work when applied to a certain type of data image, but not when applied to other types of data images. Moreover, many previous approaches are not image transformation invariant and do not tolerate entry of noise.

Continuing, one approach which provides a rotationally invariant result is termed "Equal Angular Sampling". Said method provides a concatenation of numbers which are distances from a centroid in a data image to an intersection point with an object boundary. Said technique encounters problems, however, where objects with irregular shapes, with concave boundaries and/or wherein holes are encountered.

The use of Moment Invariants to describe the geometrical shape features of data images was proposed more than thirty (30) years ago by Hu in an article titled "Visual Pattern Recognition By Moment Invariants", IRE Trans. on Information Theory, IT-8, (Feb. 1963). The method is based in modeling an image as a physical object with masses distributed in two dimensional space. It typically treats the pixel intensities as the probability distribution value of the object masses. The central moments in various orders are calculated on distributions. A set of central moment invariants is derived from making algebraic combinations of the central moments. The most important property of he technique is that the resulting descriptive quantities are transformation invariant, (ie. the central moment invariants remain unchanged when the image undergoes scaling, rotation, translation, intensity, or color platter changes). See an article titled "Recognitive Aspects Of central moment Invariants", by Abu-Mostafa et al., IEEE Trans. on Pattent Analysis and Mach Intell., Vol. PAMI-6, No. 6, (Nov. 1984).

Additional references of interest are:

"Image Analysis Via the General Theory Of Moments", Teague, J. Opt. Soc. America, Vol. 70, No. 8, (Aug. 1980), which discloses that a 2D shape obtained from central moment invariants defined on the second central moments can be viewed as an elliptic approximation of the shape; and "A Transformation-Invariant Recursive Subdivision Method For Shape Analysis", Zhu and Poh, IEEE Proc. of the 9th Int. Conf. on Pattern Recog., Rome, Italy, (Nov. 14–17, 1988).

It is to be appreciated that Statistical and central moment-based descriptions of data can distinguish data images at only very rough levels. That is, an image index associated with a data image is not unique and could be arrived at by analysis of an alternative data image. In addition, the computations involved in practicing said Statistics and central moment-based approaches can be complicated and time consuming and can require both character and numeric symbols in a resultant image index. And the use of the central moment invariant approach can involve the computation of an image index in high orders.

With the present invention in mind a Search of Patents was performed with the result being that very little was found. A Patent to Windig, U.S. Pat. No. 5,841,891 is disclosed, however, as it identifes the calculation of Eigenvalues, but in a method for enhancing images. A Patent to Shimura et al., U.S. Pat. No. 5,644,756 is also identified as it describes generating calculated feature data for identifying images, with application in image identification. A Patent, U.S. Pat. No. 5,608,862 to Enokida is disclosed as it describes development of a tag which indicates the length of data in hierarchically coded image data. U.S. Pat. No. 5,572,726 to Hasuo is disclosed as it describes an index image for use in retrieval of data. A Patent to Tsujumura et al., U.S. Pat. No. 5,586,197 is disclosed as it describes using color as a basis of searching for a data image in an image database. Finally, a U.S. Pat. No. 4,742,558 to Ishibashi et al. is disclosed use of a hierarchical structure for use in image retrieval and display.

An updated Patent Search conducted with a present invention pixel pre-selection methodology in mind, has provided the following additional Patents:

U.S. Pat. No. 5,748,777 to Katayama which describes apparatus and methodology for extracting outline data;

U.S. Pat. No. 4,896,364 to Lohscheller which describes a method of detecting boundary structures in a video signal;

U.S. Pat. No. 5,805,728 to Munesada et al., which describes an edge line measuring method;

U.S. Pat. No. 5,930,391 to Kinjo which describes a method of extracting an outer edge in an image;

U.S. Pat. No. 5,902,987 to Coffman et al. which describes a method and apparatus for locating the edges of patterns in a stored image;

U.S. Pat. No. 5,889,882 to Senn et al. which describes a method of determining a skin line in a digital medical image;

U.S. Pat. No. 5,828,771 to Bloomberg which describes an image processing technique which automatically analyzes an image to determine if it is an original or a copy.

U.S. Pat. No. 5,790,269 to Masaki et al. which describes a method and apparatus for extracting edge or contour information; and U.S. Pat. No. 4,849,914 to Medioni et al. which describes a method and apparatus for registering color separation using edge based registration techniques.

In addition, the following publications are also known and disclosed:

"Query By Image And Video Content", Flickner, IEEE Computer, pp. 23–30, (Sep. 1995);

"Compact Representations Of Videos Through Dominant And Multiple Motion Estimations", Sawhney & Ayer, IEEE Transactions On Pattern Analysis And Machine Intelligence", pp. 814–830, Vol. 18, No. 8, (Aug. 1996);

"Recovering 3D Motion Of Multiple Objects Using Adaptive Hough Transform", ITian & Shah, EEE Transactions On Pattern Analysis And Machine Intelligence, Vol. 19, No. 10, pp. 1178–1183, (Oct. 1997);

"A Survey Of Technologies For Parsing And Indexing Digital Video", Ahanger & Little, Visual Communication and Visual Representation, Vol. 7, No. 1, pp. 28–43, (1996);

"Review Of Image And Video Indexing Techniques", Idris & Panchanathan, Visual Communication and Image Representation, Vol. 8, No. 2, pp. 146–166, (1977); and "Analysis Of Video Image Sequences Using Point And Line Correspondences", Wang, Karandikar & Aggarwal, Pattern Recognition, PR(24), pp. 1065–1084, (1991).

Even in view of the prior art there remains need for a convenient method of characterizing two-dimensional data images, and multi-dimensional data structures, so that they can be easily indexed, stored and retrieved, which method reduces computational requirements as much as possible. Said method should provide an index which demonstrates Uniqueness, Universality, Computational Ease, Conciseness, Invariance to data image change of scale, rotation and translation of data image object, position shifting, linear calibration of color and pixel intensity, and Resistance to random noise. Additionally, said methodology should provide for tracking image changes in sequential images, such as in videos. In answer to the identified need, the present invention provides a method of extracting data indicies from a data structure which results from application of a pixel spatial data structure location based first central moment determined mean, and non-degenerate parameter(s) determined from second central moment values, in "X", "Y" and where a three-dimensional data structure is investigated, "Z" orthogonally related directions. Additional benefit is identified as deriving from a frequency-of-occurance determination based, significant pixel identifying, pre-selection procedure, which results in said data index then being further comprised of typically orthogonal specific frequency integer counts of pre-selected pixels.

DISCLOSURE OF THE INVENTION

The Present Invention has as its focus the producing of an Index (I) which is Non-Degenerately, (ie. Uniquely in that each Index describes "One Image" at some Hierarchical Level), descriptive of a Multiple, (eg. Two), Dimensional Data Image (MDDI), which Index (I) is Image Rotation, Translation, Scaling, and Intensity, Color etc. invariant. (It is noted that Intensity and Color of, for instance, a Digital Data Image are typically combined to form a single value at each Pixel (x, y) location which is a function f(x,y), by for instance, a formula that has as input variables "amounts" of Red, Green and Blue content as well as Intensity for each Pixel).

The present invention procedure involves finding, at each of a number of Hierarchical depth levels, Eigenvalues, which Eigenvalues can each be thought of as the Major ($\lambda_1$) and Minor ($\lambda_2$) Axes of a "Characteristic Virtual Ellipse" which represents said Hierarchical depth level. (The term "Virtual" indicates that the Ellipse is not usually actually drawn, but rather can be helpfully visualized as descriptive of the geometry of the Data).

At the First Hierarchical Level, the Image as a whole is considered and subjected to Mathematical Techniques, which lead to determination of $\lambda_{11}+\lambda_{21}$, which $\lambda_{11}+\lambda_{21}$ are the major and minor axes of the Characteristic Virtual Ellipse. The Non-degenerate Index Component, (which is a functional focus of the present invention as applied in the context of the Eigenvalues), for said First Level is then calculated from an equation which returns a Non-Degenerate result, such as:

$$I_1 = \frac{(\lambda_{11} - \lambda_{21})^2}{\lambda_{11} + \lambda_{21}}$$

Next, the Characteristic Virtual Ellipse Minor Axis Eigenvalue is typically considered as a dividing line between two "Sides" of the Data Image as a whole, and the data on each side thereof is considered separately, at what is the Second Hierarchical Data Depth Level, of the Procedure. For each of said two (2) "Sides" additional Eigenvalues, which are major and minor axes of characteristic virtual ellipses, are calculated and for each of said two (2) "Sides", and Non-degenerate Index Components for said Second Level are then calculated from Non-Degenerate returning Equations, such as:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

An updated Non-Degenerate Index is formed by concatenation of the Three Index Components so far found, (ie. (I1) from the First Level Data (L1) Image as a whole plus two (I2 and I3) from the Second level (L2)):

I=I1 I2 I3, (or any combination or permutation thereof).

Next, Data in each "Side" identified at the Second Level (L2) is divided, typically around the Minor Characteristic Virtual Ellipse Axis thereby providing a Third Level with Four (4) Separate Sets of Data. Each of said Separate Sets of Data is then subjected to similar Mathematical Treatment to the end that Four additional Non-Degenerate Index Components (I4, I5, I6 and I7), are derived, and concatenated onto or with the Three Non-Degenerate Index Components (I1, I2 and I3) already present to provide a string of Seven Non-Degenerate Index Components comprising (I1, I2, I3, I4, I5, I6 and I7) in some functional permuted order.

The above procedure can be carried forward to as many Hierarchical Depth Levels as desired to provide a Non-Degenerate Index of a desired length and level of accuracy, even down to where a single Pixel distinguishes the Image defined by a produced Index (I).

(Note—known techniques identify Pixel Color and Brightness content and perhaps some shape content, but do not do so in a manner which is Image Rotation, Translation, Scaling, and Intensity, Color etc. invariant). At this point, educated reflection should result in realization that Linear Rotation or Translation or Scaling of a Data Image will not change Non-degenerate Index (I) element values produced by practice of the Present Invention, as the underlying Eigenvalues will not change. Similarly, if the same linear change is made to Intensity at all Pixels in an Image, no change will occur in calculated Non-degenerate Index element values.

It is also to be understood that while the above specifies the minor axis $\lambda_2$ of the characteristic virtual ellipse as a data dividing locus at each hierarchical data depth level after the first, it is possible to use the major axis $\lambda_1$. In addition, it is possible to use both the major and minor axes as data dividing loci and, for instance, at the second data depth level add four additional Index Elements. The third data depth level would then add sixteen additional Index Elements and so on.

In light of the foregoing, a number of variations of the present invention method are recited directly.

A very general present invention method of providing an identifying data set index (I) for an "N" dimensional data set consisting of a multiplicity of pixels, comprises the steps of:
 a. determining Eigenvalues for essentially the entire data set, said Eigenvalues being a major axis and (N−1) minor axes of a characteristic virtual data set mathematical object, then calculating a first non-degenerate data set index element using a formula which operates on said major axis and at least one of said (N−1) minor axes;
 b. dividing said essentially entire "N" dimensional data set into at least first and second data set parts about at least one axis selected from the group consisting of: (said major axis and said (N−1) minor axes), and for at least one of said at least first and second data set parts independently determining "N" Eigenvalues therefore, said "N" Eigenvalues being a manor axis and (N−1) minor axes of a mathematical object for said at least one of said at least first and second data set parts, and then calculating at least one additional non-degenerate data set index element using formula(s) which operate on said major axis and at least one of said (N−1) minor axes in said at least one of said at least first and second data set parts, and return a non-degenerate result; and
 c. concatenating at least two resulting non-degenerate data set index elements in any functional permuted order to provide said identifying data set index (I).

Continuing, another recitation of a present invention method of providing an identifying data image index (I) for a two dimensional data image consisting of a multiplicity of pixels, said method comprises the steps of:
 a. determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues;
 b. dividing said essentially entire two dimensional data image into at least first and second data image parts about an axis selected from the group consisting of: (said minor axis and said major axis), and for each of said at least first and second data image parts independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result;
 c. concatenating at least two of said first (I1), second (I2) and/or third (I3) non-degenerate data image index elements in any functional permuted order to provide said identifying data image index (I).

Continuing, a more focused present invention method of providing an identifying data image index (I) for a two dimensional data image consisting of a multiplicity of pixels, comprises the steps of:

a. determining Eigenvalues for essentially the entire data image, said Eigenvalues being a major axis ($\lambda_{21}$) and a minor axis ($\lambda_{11}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. concatenating said first, second and third non-degenerate data image index elements to provide said identifying data image index (I) by a selection from the group consisting of:
 I=I1 I2 I3;
 I=I1 I3 I2;
 I=I2 I1 I3;
 I=I2 I3 I1;
 I=I3 I1 I2; and
 I=I3 I2 I1.

Another present invention method of providing an identifying data image index (I) for a two dimensional data image consisting of a multiplicity of pixels, comprises the steps of:
 a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. dividing said each of said first and second image parts from step b., reach about an axis selected from the group consisting of: (said minor axis and said major axis thereof), to produce third, forth, fifth and sixth image parts and for at least one of said third, forth, fifth and sixth image parts independently determining Eigenvalues thereof, said determined Eigenvalues being selected from the group consisting of:

a major axis ($\lambda_{14}$) and a minor axis ($\lambda A_{24}$) for the third of said separate characteristic virtual ellipses, and major axis ($\lambda_{15}$) and a minor axis ($\lambda_{25}$) for the forth of said separate characteristic virtual ellipses, a major axis ($\lambda_{16}$) and a minor axis ($\lambda_{26}$) for the fifth of said separate characteristic virtual ellipses, and major axis ($\lambda_{17}$) and a minor axis ($\lambda_{27}$) for the sixth of said separate characteristic virtual ellipses, and then calculating forth (I4), fifth (I5), sixth (I6) and seventh (I7) non-degenerate data image index elements using as appropriate the formulas:

$$I_4 = \frac{(\lambda_{14} - \lambda_{24})^2}{\lambda_{14} + \lambda_{24}} \quad I_5 = \frac{(\lambda_{15} - \lambda_{25})^2}{\lambda_{15} + \lambda_{25}}$$

$$I_6 = \frac{(\lambda_{16} - \lambda_{26})^2}{\lambda_{16} + \lambda_{26}} \quad I_7 = \frac{(\lambda_{17} - \lambda_{27})^2}{\lambda_{17} + \lambda_{27}}$$

d. concatenating said first (I1), and at least one produced non-degenerate data index element(s) selected from the group consisting of said: (second (I2), third (I3), forth (I4), fifth (I5), sixth (I6) and seventh (I7) non-degenerate data index elements), in any functional permuted order, to provide said identifying data image index (I).

Said method of providing an identifying data image index (I) for a two dimensional data image consisting of a multiplicity of pixels can, in steps c. and d. thereof, provide that all of said first (I1), second (I2), third (I3), forth (I4), fifth (I5), sixth (I6) and seventh (I7) non-degenerate data index elements, are calculated and concatenated, in any functional permuted order, to provide said identifying data image index (I).

Said present invention method, as is true for all variations thereof presented herein, can, as a preliminary step, subject the data to a pre-selection criteria to identify pixels which meet specified criteria. As is better described in the Section of this Specification titled "Data Pixel Pre-Selection", a prefered pixel pre-selection criteria involves identifying and retaining pixels which define image feature edges, while eliminating pixels from a data set which are not associated therewith.

Such a modified method of providing an identifying data image index (I) for a two dimensional data image consisting of a multiplicity of pixels can be recited as comprising the steps of:

a. applying a pixel pre-selection criteria to eliminate pixels not associated with image feature edges;

b. determining Eigenvalues for essentially the entire remaining data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

c. dividing said essentially entire two dimensional data image into first and second data image parts about an axis selected from the group consisting of:
said minor axis;
said major axis; and
an axis intermediate thereto;
and for at least one of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

d. concatenating at least two of said determined first, second and third non-degenerate data image index elements in any functional permuted order to provide said identifying data image index (I).

Continuing, another variation on the present invention method of providing an identifying data image index (I) for a two dimensional data image consisting of a multiplicity of pixels, comprises the steps of:

a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using a formula which operates on said Eigenvalues:

b. dividing said essentially entire two dimensional data image into first, second, third and forth data image parts using said minor axis and said major axis as dividing means, said first, second, third and forth data image parts being oriented in a first, second, third and forth quadrant pattern defined by said major and minor axes, in said two dimensional data image;

c. for at least one of said first, second, third and forth data image parts independently determining Eigenvalues of a characteristic virtual ellipse therefore, said Eigenvalues being selected from the group consisting of:

a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;

d. calculating at least one additional non-degenerate data image index element using formula(s) which operates on Eigenvalues corresponding to said at least one of said first, second, third and forth data image parts determined in step. c; and e. concatenating at least two resulting non-degenerate data index elements, in any functional permuted order, to provide said identifying data image index (I).

In said variation on the present invention method of providing an identifying data image index (I) for a two dimensional data image consisting of a multiplicity of pixels wherein Eigenvalues for each of said first, second, third and forth data image parts are independently determined, said Eigenvalues being:

a major axis ($\lambda_{11}$) and a minor axis ($\lambda_{21}$) for the first of said separate characteristic virtual ellipses, and a major axis ($\lambda_{12}$) and a minor axis ($\lambda_{22}$) for the second of said separate characteristic virtual ellipses, a major axis ($\lambda_{13}$) and a minor axis ($\lambda_{23}$) for the third of said separate characteristic virtual ellipses, and a major axis ($\lambda_{14}$) and a minor axis ($\lambda_{24}$) for the forth of said separate characteristic virtual ellipses;

step d. involves calculating four additional non-degenerate data image index element using formula(s) which operate on Eigenvalues corresponding to said first, second, third and forth data image parts determined in step. c; and e. concatenating said resulting five non-degenerate data index elements, in any functional permuted order, to provide said identifying data image index (I).

Said variation on the present invention method of providing an identifying data image index (I) for a two dimensional data image consisting of a multiplicity of pixels can further comprise dividing said each of said first, second, third and forth data image parts from step b., each about at least one axis selected from the group consisting of: (said minor axis and said major axis) thereof, to identify at least two, and possibly four, new data image parts in each of said first, second, third and forth data image parts; and for at least some of the new data image parts determining Eigenvalues therefore, said Eigenvalues being a major axis and a minor axis for a characteristic virtual ellipse for said newly formed data image part(s); and concatenating at least some of the calculated non-degenerate data index elements, in any functional permuted order, to provide said identifying data image index (I).

It is also to be appreciated that given a present invention index (I) as determined by any of the foregoing methods, it is possible to construct a data image or set by expanding each index element into a set of pixels, by an essential reversal of the recited procedural steps.

It is also noted that a the present invention comprises a method of identifying similarities in a first data set to those in a second data set. Said method comprises the steps of, for each said data set:

a. determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues; and b. comparing said first (I1) non-degenerate data image index element for said first data set to that for said second data set.

Further, said method of identifying similarities in one a first data set to those in a second data set can comprise the steps of, for each said data set:

b. dividing said essentially entire two dimensional data image into at least first and second data image parts about an axis selected from the group consisting of: (said minor axis and said major axis), and for each of said at least first and second data image parts independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements, determined from two of said at least two data image parts, using formulas which return a non-degenerate result; and c. comparing at least said second (I2) non-degenerate data image index element for said first data set to that for said second data set.

Of course, the method of identifying similarities in one a first data set to those in a second data set can proceed to comparison of the third (I3) and additional non-degenerate data image index elements obtained from each of the data sets.

DATA PIXEL PRE-SELECTION

Continuing, with the foregoing basic methodology in mind, it is disclosed that a preferred version of the present invention methodology, while again begining with the providing of a data structure, and proceeding to determine at least one data structure characterizing vector(s) which facilitates indexing, storage and retrieval of the data structure, additionally includes data point pre-selection. Data structure characterizing vector(s) is/are then constructed from typically orthogonally specific "frequency-of-occurance" integer counts of pixels which are selected upon meeting an associated intensity or color or combined intensity and color gradient criteria, and for each orthogonal direction, calculated pixel spatial data structure location based first central moment, and non-degnerate parameter(s) determined from second central moment values.

The reason pixels pre-selection is desirable is that processing each pixel in a data structure when calculating associated spatial first and second central moments takes time, and because where region(s) of essentially similar pixel intensity or color or combined intensity and color content exists in a data structure there is limited value in performing spatial central moment calculations at every present pixel, (unless, perhaps, the data structure, beneficially visualized as two-dimensional picture graphic, has very few high gradient "edges" of depicted objects therein), the present invention teaches that pixel values in a data structure should be subjected to a "frequency of occurance" pre-selection procedure prior to calculating any data structure pixel "spatial location" based first central moment and non-degenerate parameter(s) determined from second central central moment values.

The presently disclosed version of the invention teaches a pre-selection of all pixels in a data structure, (eg. two-dimensional picture graphics), to determine which thereof are in regions in which change:

$$\nabla x = \frac{\delta f(x,y)}{\delta x}; \quad \nabla y = \frac{\delta f(x,y)}{\delta y};$$

or $$\nabla x = 1/3 \sum_{i=-1}^{+1} [f(x-1, y+i) - f(x+1, y+i)];$$

$$\nabla y = 1/3 \sum_{i=-1}^{+1} [f(x+i, y-1) - f(x+i, y+1)];$$

is occuring therein, as regards intensity or color or a combination of intensity and color. (Note that a parameter representing color can be calculated using a non-limiting formula such as:

(C)=(aRed+bGreen+cBlue), where aRed, bGreen and cBlue are measures of amounts of Red, Green and Blue present at a pixel location. A combined intensity and color parameter can be arrived at by, for instance, adding (C) to an Intensity representing (I) value). Then performance of spatial distribution central moment calculations is undertaken to provide first and second central moment values, utilizing only the pre-selection procedure identified pixels.

The pre-selection procedure then involves checking for reasonably large gradient change in each of the "X" and the "Y", (and "Z" directions in a 3-D data structure), at each pixel in a data structure, and then includes only pixels whereat a reasonably large gradient is determined to exist in an "X" and/or "Y" and/or "Z" direction, in spatial Pixel location distribution based first and second central moment calculations.

For emphasis, (as it is a focal point of the present invention methodology), it is again stated that the pixel pre-selection procedure determines what pixels have associated therewith sufficiently large gradients of intensity and/or color, while the calculation of first and second central moment based values, (and non-degenerate parameters based on the later), is based on spatial locations of the pixels pre-selected on said basis of intensity and/or colo gradients.

The present invention method further provides for defining ranges of gradients in each of the "X" and/or "Y" and/or "Z" directions at pixels, and determining the number of pre-selected pixels which are in each range. A data structure, (eg. two dimensional picture-graphics or multi-dimensional data structure), characterizing, identifying, vector is then constructed for each gradient range, which characterizing vector comprises, for instance, the Integer Number Count of pre-selected pixels in the "X", and/or the Integer Number Count of pre-selected pixels in "Y", and/or the Integer Number Count of pre-selected pixels in "Z", directions which have gradients in the selected range, and which vector further comprises spatial first central moments for each of the "X", "Y" and "Z" directions, as well as a non-degenerate parameter constructed from spatial second cental central moment dependent Eigenvalues:

$$s = \frac{(\lambda_1 - \lambda_2)^2}{\lambda_1 + \lambda_2}$$

calculated utilizing only the pixels with an intensity or color or combination intensity and color gradient value in an identified range. An example vector, the meaning of which will become more clear later herein is:

"#X1",

"#Y1",

"#Z1",

MEAN1 "X",

MEAN1 "Y",

MEAN1 "Z",

PARM1.

Again, the described procedure can repeated for multiple such gradient ranges of intensity or color, or both, (say gradient ranges wherein the gradient is between arbitrary units of say (1 and 10), or between arbitrary units of (11 and 100), or between arbitrary units of (100 and 500)), and the various Integer count number of pixels which fall thereinto in "X" and/or "Y" and/or "Z" directions, and spatial location first central moment, and a non-degenerate parameter constructed from spatial location second central moment values calculated utilizing only the pixels with a gradient value in a range combined to provide a unique data structure (eg. picture-graphics), indexing vector. One such vector can be determined for each range of intensity or color, or both, gradients, and the resulting vectors concatenated to provide a more definite data structure identifying index. It is noted that typical practice provides that once 50% of the pre-selected pixels have been utilized in the various ranges, no additional groupings are formed or required to provide additional vector(s) which are concatonated into the data structure identifying index.

Where more than one grouping of pre-selected pixels is made based upon application of multiple grouping defining gradient selection "frequency-of-occurance" bases then, for a two-dimensional data array, a corresponding more than one, at least one five (5) member, vector:

("#X", "#Y", MEAN "X", MEAN "Y", PARM)

as described later herein., will result. Say, for example, three ranges of gradients are defined and applied during the pixel pre-selection procedure, then three, at least five element vectors will result. Where multiple, at least five element, vectors result, the present invention teaches that said multiple vectors are concatonated in some order to provide a data structure characterizing indexing parameter. As an example, if three gradient ranges are defined with arbitrary units of:

(1 to 10);

(11 and 100);

(100 and 500)), then three (3) five (5) element vectors, (eg. V1, V2 and V3):

V1=("#X1", "#Y1", MEAN1 "X", MEAN1 "Y", PARM1); and

V2=("#X2", "#Y2", MEAN2 "X", MEAN2 "Y", PARM2); and

V3=("#X3", "#Y3", MEAN3 "XX", MEAN3 "Y", PARM3);

can formed, (one per gradient range), and said vectors can be concatonated as a selection from the group consisting of:

V1 V2 V3;

V1 V3 V2;

V2 V1 V3;

V2 V3 V1;

V3 V1 V2; and

V3 V2 V1.

to form an a data structure characterizing identifier.

Additionally, the present invention teaches that where at least three (3) different intensity, or color, or combination intensity and color based gradient ranges are defined, and where a data structure characterizing indexing vector is calculated for each, then information in each said of three of said at least three data structure characterizing indexing vectors can be applied to provide three distinct "points", which three distinct "points" can be considered as being the verticies of a triangle. Said triangle defining "points" can be re-calculated at sequential frames in a video, for instance, and sequential changes in said triangle defining "points" identified with Rotation, Translation and Scaling of objects in the data structure being analyzed. A method of tracking changes in a multi-dimensional data structure can be recited as comprising the steps of:

a. providing a first frame of a sequence of frames in a multi-dimensional data structure, each of said frames being comprised of pixels and with each of said pixels there being associated intensity and/or color(s);

b. defining at least three selected ranges of gradient(s) and defining pixel pre-selection technique gradient range selection criteria, then based on a selection from the group consisting of:
intensity gradiant;
color gradient; and
gradiant based on intensity and color;
determining pixels in said multi-dimensional data structure which demonstrate an intensity and/or color gradient within at least one of said at least three selected ranges of gradient(s); and c. performing calculations on said pre-selection technique determined pixels to determine first and second central moment values and non-degenerate parameter(s) based upon said second central moment values, said first and second central moment values being based on spatial location distributions of said pixels identified by said pre-selection technique; separate calculations being performed utilizing pixels in each of said at least three ranges of gradients;

d. utilizing information from the separate calculations performed in three of said at least three ranges of gradients in step c. to form three points which are assigned as verticies of a triangle for said first frame of a sequence of frames in a multi-dimensional data structure comprising pixels;

e. providing a second frame of a sequence of frames in a multi-dimensional data structure, each of said frames being comprised of pixels and with each of said pixels there being associated intensity and/or color(s);

f. defining gradient range selection criteria substantially the same as in step b. and utilizing an intensity and/or color gradient determining pre-selection technique which is substantially the same as in step b. to determine pixels in said multi-dimensional data structure which demonstrate an intensity and/or color gradient within at least three of said at least three selected range of gradient(s), said at least three selected range of gradient(s) being substantially the same as in step b.; and g. performing calculations on said step f. pre-selection technique determined pixels to determine first and second central moment values and non-degenerate parameter(s) based upon said second central moment values, said first and second central moment values being based on spatial location distributions of said pixels identified by said pre-selection technique; separate calculations being performed utilizing pixels in each of said at least three ranges of gradients;

h. utilizing information from the separate calculations performed in said three ranges of gradients in step g. to form three points which are assigned as verticies of a triangle for said second frame of a sequence of frames in a multi-dimensional data structure comprising pixels; and i. comparing the results of practice of steps d. and h. to determine translation, rotation and scaling of objects identified in said first and second sequential frames of said multi-dimensional data structure.

Continuing, the present invention, in a very basic sense, is a method of characterizing data structures, (eg. two dimensional picture graphics), comprising:

1. utilizing an intensity and/or color gradient determining "frequency-of-occurance" pre-selection technique to determine pixels in said data structure which should be utilized, (ie. are associated with "edges" of forms in the data structure); and 2. performing calculations to determine first and second central moment values and non-degenerate parameter(s) based upon said second central moment values, said first central central moment values and second central moment values being based on spatial location distributions of said pixels identified by said "frequency of occurance" pre-selection technique.

To the Inventor's knowledge a two step procedure, combining "frequency-of-occurance" pixel pre-selection followed by calculations to determine "spatial" first and second central moment values of said pre-selected pixels, has not been previously reported.

Application of present invention methodology to a two dimensional picture graphic, for instance, typically results in at least one five (5) member data structure characterizing index vector being produced, in which the members of the vector are:

a. number of pre-selected pixels in "X" direction, said selection criteria being based on a gradient "frequency-of-occurance" basis;

b. number of pre-selected pixels in "Y" direction, said selection criteria being based on a gradient "frequency-of-occurance" basis;

c. a spatially based "X" direction calculated first central moment for the pre-selected pixels in the "X" direction, said selection criteria being based on a gradient "frequency-of-occurance" basis;

d. a spatially based "Y" direction calculated first central moment for the pre-selected pixels in the "Y" direction, said selection criteria being based on a gradient "frequency-of-occurance" basis;

e. a non-degenerate parameter calculated from spatially based second central moment.

As alluded to earlier herein, such a data structure characterizing indexing vector can be represented as"

("#X", "#Y", MEAN "X", MEAN "Y", PARM);
where:

"#X" is the Integer number of pixels selected by applying the pre-selection frequency-of-occurance criteria to intensity or color or combination intensity and color gradients in the "X" direction;

"#Y" is the Integer number of pixels selected by applying the pre-selection frequency-of-occurance criteria to intensity or color or combination intensity and color gradients in the "Y" direction;

Mean "X" is the spatial location based first central moment of the "#X" pixels selected by applying the pre-selection frequency-of-occurance criteria to intensity or color or combination intensity and color gradients in the "X" direction;

Mean "Y" is the spatial location based first central moment of the "#Y" pixels selected by applying the pre-selection frequency-of-occurance criteria to intensity or color or combination intensity and color gradients in the "Y" direction; and PARM is a value calculated from spatial location based second central moment dependent Eigenvalues, utilizing pixels selected by applying the pre-selection frequency-of-occurance criteria to intensity or color or combination intensity and color gradients in the "X" and "Y" directions, such as provided by the formula:

$$s = \frac{(\lambda_1 - \lambda_2)^2}{\lambda_1 + \lambda_2}$$

where $(\lambda_1)$ and $(\lambda_2)$ are said Eigenvalues.

Continuing, a present invention method of characterizing data structures can then be recited as comprising the steps of:
a. providing an at least two dimensional data structure comprising pixels with each which are associated intensity and/or colors;
b. defining a gradient range selection criteria;
c. utilizing a pixel pre-selection technique based on a selection from the group consisting of:
   an intensity gradiant;
   a color gradient; and
   a gradiant based on intensity and color;
   to determine pixels in said data structure which demonstrate an intensity and/or color gradient which meet said gradient range selection criteria; and
d. performing calculations on said pre-selection technique determined pixels to determine selection(s) from the group consisting of:
   first central moment(s);
   second central moment(s); and
   non-degenerate parameter(s) based upon said second central moment(s)
said first and second central moments being based on spatial location distributions of said pixels identified by said pre-selection technique.

Said present invention method can be further identified as operating on a data structure which is a two dimensional picture graphic, and in which second central moments and non-degenerate parameter(s) based upon said second central moments are determined, and in which at least one five (5) member data structure characterizing index vector is produced, the members of said at least one five (5) member data structure characterizing index vector being comprised of, in any order:
a. number of pre-selected pixels in "X" direction, said selection criteria being based on a gradient "frequency-of-occurance" basis;
b. number of pre-selected pixels in "Y" direction, said selection criteria being based on a gradient "frequency-of-occurance" basis;
c. spatially based "X" direction calculated first central moment for the pre-selected pixels in the "X" direction, said selection criteria being based on a gradient "frequency-of-occurance" basis;
d. spatially based "Y" direction calculated first central moment for the pre-selected pixels in the "Y" direction, said selection criteria being based on a gradient "frequency-of-occurance" basis;
e. a non-degenerate parameter calculated from spatially based second central moment dependent Eigenvalues.

Further, said data structure characterizing indexing vector can be represented as
("#X", "#Y", MEAN "X", MEAN "Y", PARM);
where the vector entries were described earlier herein.

A present invention method of characterizing data structures can also be recited as comprising:
a. providing a multi-dimensional data structure comprising pixels with each of which are associated intensity and/or colors;
b. defining gradient range selection criteria;
c. utilizing a pixel pre-selection technique based on a selection from the group consisting of:
   an intensity gradiant;
   a color gradient; and
   a gradiant based on intensity and color;
   to determine pixels in said multi-dimensional data structure which demonstrate intensity and/or color gradient(s) which meet said gradient range selection criteria; and
d. performing calculations on said pre-selection technique determined pixels to determine first and second central moment and non-degenerate parameter(s) based upon said second central moment values, said first and second central moment values being based on spatial location distributions of said pixels identified by said pre-selection technique, separate calculations being performed utilizing pixels in each of said at least one range(s) of gradients.

Continuing, calculation of second central moment related Eigenvalues was described earlier herein, where the invention which has as its focus the producing of an Index (I) which is Non-Degenerately, (ie. Uniquely in that each Index describes "One Image" at some Hierarchical Level), descriptive of a Multiple, (eg. Two), Dimensional Data Image (MDDI), which Index (I) is Image Rotation, Translation, Scaling, and intensity, color etc. invariant. (It is noted that intensity and color of, for instance, a Digital Data Image are typically combined to form a single value at each Pixel (x, y) location which is a function f(x,y), by for instance, a formula that has as input variables "amounts" of Red, Green and Blue content as well as intensity for each Pixel).

The invention as earlier disclosed is a procedure which involves finding, at each of a number of Hierarchical depth levels, Eigenvalues, which Eigenvalues can each be thought of as the Major ($\lambda_{11}$) and Minor ($\lambda_{21}$) Axes of a "Characteristic Virtual Ellipse" which represents said. Hierarchical depth level. (The term "Virtual" indicates that the Ellipse is not usually actually drawn, but rather can be helpfully visualized as descriptive of the geometry of the Data).

At the first Hierarchical Level, the Image as a whole is considered and subjected to Mathematical Techniques, which lead to determination of ($\lambda_{11}$) which ($\lambda_{21}$) are the major and minor axes of the Characteristic Virtual Ellipse. The Non-degenerate Index Component, (which is a functional focus of the present invention as applied in the context of the Eigenvalues), for said first Level is then calculated from an equation which returns a Non-Degenerate result, such as:

$$I_1 = \frac{(\lambda_{11} - \lambda_{21})^2}{\lambda_{11} + \lambda_{21}}$$

While the presently disclosed version of the invention methodology dous not typically so provide, the version presented earlier next typically provides that the Characteristic Virtual Ellipse Minor Axis Eigenvalue is considered as a dividing line between two "Sides" of the Data Image as a whole, and the data on each side thereof is considered separately, at what is the second Hierarchical Data Depth Level, of the Procedure. For each of said two (2) "Sides" additional Eigenvalues, which are major and minor axes of characteristic virtual ellipses, are calculated and for each of said two (2) "Sides", and Non-degenerate Index Components for said second Level are then calculated from Non-Degenerate returning Equations, such as:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

An updated Non-Degenerate Index is formed by concatenation of the Three Index Components so far found, (ie. (I1) from the first Level Data (L1) Image as a whole plus two (I2 and I3) from the second level (L2)):
I=I1 I2 I3, (or any combination or permutation thereof).

Next, Data in each "Side" identified at the second Level (L2) is divided, typically around the Minor Characteristic Virtual Ellipse Axis thereby providing a Third Level with Four (4) Separate Sets of Data. Each of said Separate Sets of Data is then subjected to similar Mathematical Treatment to the end that Four additional Non-Degenerate Index Components (I4, I5, I6 and I7), are derived, and concatenated onto or with the Three Non-Degenerate Index Components (I1, I2 and I3) already present to provide a string of Seven Non-Degenerate Index Components comprising (I1, I2, I3, I4, I5, I6 and I7) in some functional permuted order.

The above procedure can be carried forward to as many Hierarchical Depth Levels as desired to provide a Non-Degenerate Index of a desired length and level of accuracy, even down to where a single Pixel distinguishes the Image defined by a produced Index (I).

(Note—known techniques identify Pixel color and Brightness content and perhaps some shape content, but do not do so in a manner which is Image Rotation, Translation, Scaling, and intensity, color etc. invariant). At this point, educated reflection should result in realization that Linear Rotation or Translation or Scaling of a Data Image will not change Non-degenerate Index (I) element values produced by practice of the Present Invention, as the underlying Eigenvalues will not change. Similarly, if the same linear change is made to intensity at all Pixels in an Image, no change will occur in calculated Non-degenerate Index element values.

It is also to be understood that while the above specifies the minor axis $\lambda_{21}$ of the characteristic virtual ellipse as a data dividing locus at each hierarchical data depth level after the first, it is possible to use the major axis $\lambda_{11}$. In addition, it is possible to use both the major and minor axes as data dividing loci and, for instance, at the second data depth level add four additional Index Elements. The third data depth level would then add sixteen additional Index Elements and so on.

As should now be appreciated, the present invention is, in a very basic sense, a method of characterizing data structures, (eg. picture graphics), comprising, in any functional permuted order:

a. providing a data structure, (eq. a picture graphic);
b. defining gradient range selection criteria and utilizing a pixel pre-selection technique based on a selection from the group consisting of:
  an intensity gradiant;
  a color gradient; and
  a gradiant based on intensity and color;
  to determine pixels in said multi-dimensional data structure which demonstrate intensity and/or color gradient(s) which meet said gradient range selection criteria and which are to be utilized; and
c. defining ranges of gradients;
d. for each gradient range, performing calculations to determine first central moment values in at least two typically orthogonal directions, and second central moment values and non-degenerate parameter(s) based upon said second central moment values, said first and second central moment values being based on spatial location distributions of said pixels identified by said "frequency of occurance" pre-selection technique; and
e. forming a data structure characterizing index vector for at least one of said defined gradient ranges.

A preferred data structure characterizing indexing vector comprises":

("#X", "#Y", MEAN "X", MEAN "Y", PARM);

the explanations of the entries in said data structure characterizing indexing vector having been described earlier herein. And, where more than one data structure characterizing indexing vector is calculated, (each data structure characterizing indexing vector corresponding to a range of intensity or color or combination intensity and color gradient), said multiple data structure characterizing indexing vectors can be concatenated to provide a more definite data structure characterizing index.

In light of the foregoing, a number of variations of the present invention method are recited directly. It is to be appreciated that each of the following recitations includes the pixel pre-selection methodology just described. That is, rather than act on all pixels in a data structure, pixels in a data structure are pre-selected prior to practicing the methodology, to provide a beginning reduced pixel containing data structure.

A very general method of providing an identifying data structure index (I) for an "N" dimensional data structure consisting of a multiplicity of pixels comprises a pre-selection of pixels in said "N" dimensional data set based upon the meeting of an intensity and/or color gradient determining pre-selection criteria to determine pixels in said data structure which demonstrate an intensity and/or color gradient within a selected range of gradients;

said method further comprising the steps of:

a. utilizing said pre-selected pixels, determining Eigenvalues for essentially the entire data structure, said Eigenvalues being a major axis and (N−1) minor axes of a characteristic virtual data structure mathematical object, then calculating a first non-degenerate data structure index element using a formula which operates on said major axis and at least one of said (N−1) minor axes;

b. dividing said essentially entire "N" dimensional data structure into at least first and second data structure parts about at least one axis selected from the group consisting of: (said major axis and said (N−1) minor axes), and for at least one of said at least first and second data structure parts, utilizing said pre-selected pixels, independently determining "N" Eigenvalues therefore, said "N" Eigenvalues being a major axis and (N−1) minor axes of a mathematical object for said at least one of said at least first and second data structure parts, and then calculating at least one additional non-degenerate data structure index element using formula(s) which operate on said major axis and at least one of said (N−1) minor axes in said at least one of said at least first and second data structure parts, and return a non-degenerate result; and c. concatenating at least two resulting non-degenerate data structure index elements in any functional permuted order to provide said identifying data structure index (I).

Continuing, another recitation of a present invention method of providing an identifying data image index (I) for a two dimensional data image consisting of a multiplicity of pixels, said method comprises a pre-selection of pixels in said two dimensional data set based upon the meeting of an intensity and/or color gradient determining pre-selection criteria to determine pixels in said data structure which demonstrate an intensity and/or color gradient within a selected range of gradients;

said method further comprising the steps of:

a. utilizing said pre-selected pixels, determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues;

b. dividing said essentially entire two dimensional data image into at least first and second data image parts about an axis selected from the group consisting of: (said minor axis and said major axis), and for each of said at least first and second data image parts, utilizing said pre-selected pixels, independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result;

c. concatenating at least two of said first (I1), second (I2) and/or third (I3) non-degenerate data image index elements in any functional permuted order to provide said identifying data image index (I).

Continuing, a more focused present invention method of providing an identifying data image index (I) for a two dimensional data image consisting of a multiplicity of pixels, comprises a pre-selection of pixels in said two dimensional data set based upon the meeting of an intensity and/or color gradient determining pre-selection criteria to determine pixels in said data structure which demonstrate an intensity and/or color gradient within a selected range of gradients;

said method further comprising the steps of:

a. utilizing said pre-selected pixels, determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of: (said minor axis and said major axis), and for each of said first and second data image parts, utilizing said pre-selected pixels, independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. concatenating said first, second and third non-degenerate data image index elements to provide said identifying data image index (I) by a selection from the group consisting of:

I=I1 I2 I3;
I=I1 I3 I2;
I=I2 I1 I3;
I=I2 I3 I1;
I=I3 I1 I2; and
I=I3 I2 I1.

Another present invention method of providing an identifying data image index (I) for a two dimensional data image consisting of a multiplicity of pixels, comprises a pre-selection of pixels in said two dimensional data set based upon the meeting of an intensity and/or color gradient determining pre-selection criteria to determine pixels in said data structure which demonstrate an intensity and/or color gradient within a selected range of gradients;

said method further comprising the steps of:

a. utilizing said pre-selected pixels, determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of: (said minor axis and said major axis), and for each of said first and second data image parts, utilizing said pre-selected pixels, independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. dividing said each of said first and second image parts from step b., each about an axis selected from the group consisting of: (said minor axis and said major axis thereof), to produce third, forth, fifth and sixth image parts and for at least one of said third, forth, fifth and sixth image parts, utilizing said pre-selected pixels, independently determining. Eigenvalues thereof, said determined Eigenvalues being selected from the group consisting of:

a major axis ($\lambda_{14}$) and a minor axis ($\lambda_{24}$) for the third of said separate characteristic virtual ellipses, and major axis ($\lambda_{15}$) and a minor axis ($\lambda_{25}$) for the forth of said separate characteristic virtual ellipses, a major axis ($\lambda_{16}$) and a minor axis ($\lambda_{26}$) for the fifth of said separate characteristic virtual ellipses, and major axis ($\lambda_{17}$) and a minor axis ($\lambda_{27}$) for the sixth of said separate characteristic virtual ellipses, and then calculating forth (I4), fifth (I5), sixth (I6) and seventh (I7) non-degenerate data image index elements using as appropriate the formulas:

$$I_4 = \frac{(\lambda_{14} - \lambda_{24})^2}{\lambda_{14} + \lambda_{24}} \quad I_5 = \frac{(\lambda_{15} - \lambda_{25})^2}{\lambda_{15} + \lambda_{25}}$$

$$I_6 = \frac{(\lambda_{16} - \lambda_{26})^2}{\lambda_{16} + \lambda_{26}} \quad I_7 = \frac{(\lambda_{17} - \lambda_{27})^2}{\lambda_{17} + \lambda_{27}}$$

d. concatenating said first (I1), and at least one produced non-degenerate data index element(s) selected from the group consisting of said: (second (I2), third (I3), forth (I4), fifth (I5), sixth (I6) and seventh (I7) non-degenerate data index elements), in any functional permuted order, to provide said identifying data image index (I).

Said method of providing an identifying data image index (I) for a two dimensional data image consisting of a multiplicity of pixels can, in steps c. and d. thereof, provide that all of said first (I1), second (I2), third (I3), forth (I4), fifth (I5), sixth (I6) and seventh (I7) non-degenerate data index elements, are calculated and concatenated, in any functional permuted order, to provide said identifying data image index (I).

Another variation on the present invention method of providing an identifying data image index (I) for a two dimensional data image consisting of a multiplicity of pixels, comprises a pre-selection of pixels in said two dimensional data set based upon the meeting of an intensity and/or color gradient determining pre-selection criteria to determine pixels in said data structure which demonstrate an intensity and/or color gradient within a selected range of gradients;

said method further comprising the steps of:

a. utilizing said pre-selected pixels, determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using a formula which operates on said Eigenvalues:

b. dividing said essentially entire two dimensional data image into first, second, third and forth data image parts using said minor axis and said major axis as dividing means, said first, second, third and forth data image parts being oriented in a first, second, third and forth quadrant pattern defined by said major and minor axes, in said two dimensional data image;

c. for at least one of said first, second, third and forth data image parts, utilizing said pre-selected pixels, independently determining Eigenvalues of a characteristic virtual ellipse therefore, said Eigenvalues being selected from the group consisting of:

a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;

d. calculating at least one additional non-degenerate data image index element using formula(s) which operates on Eigenvalues corresponding to said at least one of said first, second, third and forth data image parts determined in step. c; and e. concatenating at least two resulting non-degenerate data index elements, in any functional permuted order, to provide said identifying data image index (I).

In said variation on the present invention method of providing an identifying data image index (I) for a two dimensional data image consisting of a multiplicity of pixels wherein Eigenvalues for each of said first, second, third and forth data image parts are independently determined, said Eigenvalues being:

a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;

step d. involves calculating four additional non-degenerate data image index element using formula(s) which operate on Eigenvalues corresponding to said first, second, third and forth data image parts determined in step. c; and e. concatenating said resulting five non-degenerate data index elements, in any functional permuted order, to provide said identifying data image index (I).

Said variation on the present invention method of providing an identifying data image index (I) for a two dimensional data image consisting of a multiplicity of pixels can further comprise dividing said each of said first, second, third and forth data image parts from step b., each about at least one axis selected from the group consisting of: (said minor axis and said major axis) thereof, to identify at least two, and possibly four, new data image parts in each of said first, second, third and forth data image parts; and for at least some of the new data image parts, utilizing pre-determined pixels, determining Eigenvalues therefore, said Eigenvalues being a major axis and a minor axis for a characteristic virtual ellipse for said newly formed data image part(s); and concatenating at least some of the calculated non-degenerate data index elements, in any functional permuted order, to provide said identifying data image index (I).

It is also to be appreciated that given a present invention index (I) as determined by any of the foregoing methods, it is possible to construct a data image or structure by expanding each index element into a structure of pixels, by an essential reversal of the recited procedural steps.

It is also noted that a the present invention comprises a method of identifying similarities in a first data structure to those in a second data structure. Said method comprises a pre-selection of pixels in both data sets based upon the meeting of an intensity and/or color gradient determining pre-selection to determine pixels in said data structure which demonstrate an intensity and/or color gradient within a selected range of gradients;

said method further comprising the steps of:

a. utilizing pre-determined pixels, determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues; and b. comparing said first (I1) non-degenerate data image index element for said first data structure to that for said second data structure.

Further, said method of identifying similarities in a first data structure to those in a second data structure can comprise the steps of, for each said data structure:

b. dividing said essentially entire two dimensional data image into at least first and second data image parts about an axis selected from the group consisting of: (said minor axis and said major axis), and for each of said at least first and second data image parts, utilizing said pre-selected pixels, independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result; and c. comparing at least said second (I2) non-degenerate data image index element for said first data structure to that for said second data structure.

Of course, the method of identifying similarities in one a first data structure to those in a second data structure can proceed to comparison of the third (I3) and additional non-degenerate data image index elements obtained from each of the data structures.

While the foregoing has consistantly identified use of major and/or minor axis as data set division criteria, it is to be understood that while preferred, this is not required. That is, for instance, after determination of a major and minor axis for an entire data set, one can divide the data set around some axis which is intermediate to the major and minor axes. In such a case present methodology of providing an identifying data set index (I) for an "N" dimensional data set consisting of a multiplicity of pixels, comprises the steps of:

a. determining Eigenvalues for essentially the entire data set, said Eigenvalues being a major axis and (N−1) minor axes of a characteristic virtual data set mathematical object, then calculating a first non-degenerate data set index element using a formula which operates on said major axis and at least one of said (N−1) minor axes;

b. dividing said essentially entire "N" dimensional data set into at least first and second data set parts about at least one axis selected from the group consisting of: (said major axis; and said (N−1) minor axes; and an axis intermediate thereto), and for at least one of said at least first and second data set parts independently determining "N" Eigenvalues therefore, said "N" Eigenvalues being a major axis and (N−1) minor axes of a mathematical object for said at least one of said at least first and second data set parts, and then calculating at least one additional non-degenerate data set index element using formula(s) which operate on said major axis and at least one of said (N−1) minor axes in said at least one of said at least first and second data set parts, and return a non-degenerate result; and c. concatenating at least two resulting non-degenerate data set index elements in any functional permuted order to provide said identifying data set index (I).

Where the data set is two dimensional and the mathematical object is an ellipse, the Eigenvalues will be the major and minor axes. In that case, a data set can be divided around either the major and minor axis, or some axis formed intermediate thereto.

It is further to be understood that while the preferred present invention mathematical object utilized to model data is an ellipse which presents with major and minor axes Eigenvalues, any functional permuted mathematical object from which can be extracted Eigenvalues can be utilized in practice of the method of the present invention, in any of its variations.

The foregoing recitation of variations on the method of the present invention which are within the scope thereof are, of course, demonstrative, and not limiting. Other variations of present invention methodology are possible and can be arrived at by combining elements of various recited step sequences in other combinations and/or orders etc.

The present invention will be better understood by reference to the Detailed Description of this Disclosure in conjunction with the accompanying Drawings.

SUMMARY

It is therefore the primary purpose of the present invention to provide a method which enables easy characterization, storage and retrieval of multi-dimensional data structures, comprising use of a translation, rotation and scaling invariant index which results from concatenating a series of Eigenvalue calculation mediated index elements, determined at a plurality of hierarchical data depth levels.

It is another primary purpose of the present invention to provide a method which enables easy comparison of at least first and second multi-dimensional data structures, comprising use of translation, rotation and scaling invariant indicies which result from, for each of said at least first and second multi-dimensional data structures, concatenating a series of Eigenvalue calculation mediated index elements, determined at a plurality of hierarchical data depth levels.

It is another primary object and/or purpose of the present invention to teach a method which pre-selects pixels in data structures to determine those pixels which demonstrate significant data structure intensity and/or color gradients in "X" and/or "Y" and/or "Z" direction(s), (tyically the result of depicted-object-edge-effects in the data structure), and utilizes said pre-selected pixels in data structure characterizing spatial first and second central moment calculations, to the end that data structure characterizing vector(s), are constructed from typically orthogonally specific frequency integer counts of said pre-selected pixels, as well as spatial data structure first monent mean(s), and non-degenerate parameter(s) determined from second central moment dependent Eigenvalues calculated utilizing pre-selected pixels with data structure intensity and/or color gradients in "X" and/or "Y" and/or "Z" direction(s) within one or more designated range(s).

It is yet another object and/or purpose of the present invention to provide a method which enables reconstruction of data sets from calculated Indicies which characterize multi-dimensional data structures, comprising use of a translation, rotation and scaling invariant index which results from concatenating a series of Eigenvalue calculation mediated index elements, determined at a plurality of hierarchical data depth levels.

Other objects and/or purposes of the present invention will become obvious by referral to the Specification text and claims.

BRIEF DESCRIPTION OF THE DRAWINGS

FIG. 1 shows a data image of an airplane and indicates three levels (L1), (L2) and (L3) of data image division.

FIG. 2a shows an ellipse with a major axis and a minor axis attributable to level (L1) data in FIG. 1.

FIGS. 2b1 and 2b2 each show ellipse major axis and a minor axis attributable to level (L2) data in FIG. 1.

FIGS. 2c1, 2c2, 2c3 and 2c4 each show ellipse major axis and a minor axis attributable to level (L3) data in FIG. 1.

FIG. 4 shows the basic flow of a basic present invention method.

DETAILED DESCRIPTION

Figure 3A:
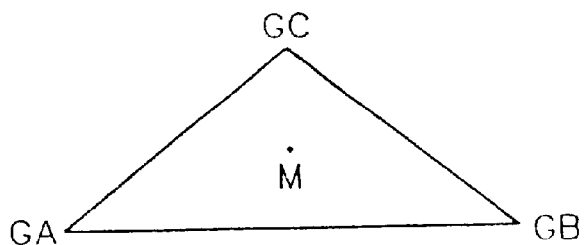
FIGS. 3a, 3b and 3c show that the present invention teaches that where at least three different intensity or color of combination intensity and color based gradient ranges are defined, and where a data structure characterizing indexing vector is calculated for each, then information in each said of three of said at least three data structure characterizing indexing vectors can be applied to provide three distinct "points", which three distinct "points" can be considered as being the verticies of a triangle GA, GB & GC, which triangle can be tracked through sequential frames to detect translation, rotation and scaling.

In the Disclosure Of The Invention Section of this Specification it was established that the present invention method, as applied to data images and data sets, includes such as:

"determining Eigenvalues for essentially the entire data set, said Eigenvalues being a major axis and (N−1) minor axes of a characteristic virtual data set mathematical object, then calculating a first non-degenerate data set index element using a formula which operates on said major axis and at least one of said (N−1) minor axes"; or "determining Eigenvalues for essentially the entire data image, said Eigenvalues being a major axis ($\lambda_1$) and a minor axis ($\lambda_2$) of a characteristic virtual ellipse"; or "dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis ($\lambda_1$) and a minor axis ($\lambda_2$) for the first of said separate characteristic virtual ellipses, and major axis ($\lambda_1$) and a minor axis ($\lambda_2$) for the second of said separate characteristic virtual ellipses";

but to this point, the Disclosure has provided no insight as to how said determination of Eigenvalues is accomplished. In the following a demonstrative two dimensional data image is assumed and a preferred method of determining Eigenvalues, comprising a major and a minor axis of a "data image characterizing virtual ellipse", is presented to provide further insight.

As discussed in the Disclosure of the Invention Section of this Specification, a prefered embodiment of the present invention methodology operates on a data structure to provides one or more characterizing vectors. Where a two (2) dimensional data structure is involved, the preferred vector has five (5) elements and appears as:

(#"X", "#Y", MEAN "X", MEAN "Y", PARM);

where:

"#X" is the Integer number of pixels selected by applying a pre-selection frequency-of-occurance criteria to intensity or color or combination intensity and color gradients in the "X" direction;

"#Y" is the Integer number of pixels selected by applying a pre-selection frequency-of-occurance criteria to intensity or color or combination intensity and color gradients in the "Y" direction;

Mean "X" is the spatial location based first central moment of the "#X" pixels selected by applying the pre-selection frequency-of-occurance criteria to intensity or color or combination intensity and color gradients in the "X" direction;

Mean "Y" is the spatial location based first central moment of the "#Y" pixels selected by applying the pre-selection frequency-of-occurance criteria to intensity or color or combination intensity and color gradients in the "Y" direction; and PARM is a value calculated from spatial location based second central moment dependent Eigenvalues, utilizing pixels selected by applying the pre-selection frequency-of-occurance criteria to intensity or color or combination intensity and color gradients in the "X" and "Y" directions, such as provided by the formula:

$$s = \frac{(\lambda_1 - \lambda_2)^2}{\lambda_1 + \lambda_2}$$

where ($\lambda_1$) and ($\lambda_2$) are said Eigenvalues.

The "#X", "BY" values are arrived by incrementing a counter each time the applying of a gradient test to each pixel in a data structure identifies a pixel as meeting an intensity and/or color gradient test criteria:

$$\nabla x = \frac{\delta f(x, y)}{\delta x}; \quad \nabla y = \frac{\delta f(x, y)}{\delta y};$$

$$\nabla x = f(x,y) - f(x+1,y); \quad \nabla y = f(x,y) - f(x,y+1))$$

as acceptable for use in additional computations leading to the evaluation of MEAN "X", MEAN "Y", and a PARM.

If only one range of gradient is designated, preferred practice provides that a single five (5) element data structure characterizing vector:

("#X", "#Y", MEAN "X", MEAN "Y", PARM), be produced. If, however, various ranges of gradient are designated, (eg. arbitrary units of say (1 and 10), or between arbitrary units of (11 and 100), or between arbitrary units of (100 and 500)), a five (5) element vector:

("#X", "#Y", MEAN "X", MEAN "Y", PARM), will typically be determined for said designated gradient range, and the resulting vectors can, as described earlier herein, then be concatenated to provide a data structure identifing index.

The methodology for determining the frequency of occurance of, (ie. values for "#X", "#Y" in a five element vector), from a data structure is straigt forward and the typically applied gradient formulas were presented earlier herein. The calculation of values for the MEAN "X", MEAN "Y", PARM is a bit more complex, and was basically disclosed earlier herein. The difference in said earlier description, and the practiced in the presently disclosed methodology being that only pixels identified by application of the gradient testing formulas are utilized in central moment calculations which determine MEAN "X", MEAN "Y", PARM. Referring to FIGS. 1, 2b1 & 2b2, and 2c1–2c4, it should be appreciated that the present invention pixel gradient testing methodology would typically return as pixels to be utilized in said central moment calculations that are identifying of the edges of the depicted airplane object. This, it must be appreciated is a dominant focus of the present invention.

Figure 3B:
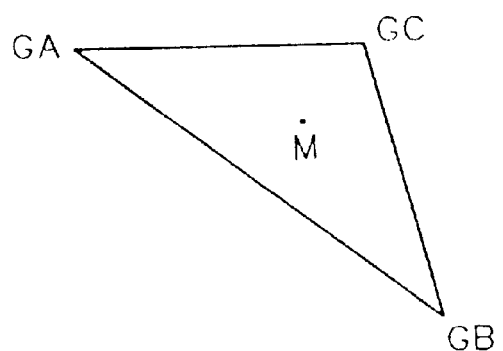
Figure 3C:
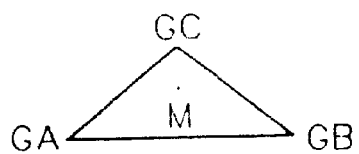

Additionally, FIGS. 3a, 3b and 3c show that the present invention teaches that where at least three different intensity or color or combination intensity and color based gradient ranges are defined, and where a data structure characterizing indexing vector is calculated for each, then information in each said of three of said at least three data structure characterizing indexing vectors can be applied to provide three distinct vertex "points", which three distinct vertex "points" can be considered as being the verticies of a triangle GA, GB & GC. FIG. 3a can be considered as a first such calculated triangle obtained utilizing data from a first frame in, for instance, a sequence of video frames. Said triangle defining vertex "points", and associated Midpoint M, can be re-calculated at sequential frames said video, for instance, and sequential changes in said triangle defining "points" identified with Rotation, Translation and Scaling of objects in the data structure being analyzed. FIG. 3b shows rotation and translation has occured, as compared to the FIG. 3a, while FIG. 3c demonstrates scaling of the images shown in FIGS. 3a and 3b. Hence, the present invention methodology allows tracking changes in, for instance, sequential two-dimensional video sequences. Mathematical Matrix Symbology provides description of sequential changes in objects data structure as:

ROTATION $$R\theta = \begin{bmatrix} \cos\theta & \sin\theta \\ -\sin\theta & \cos\theta \end{bmatrix}$$

TRANSLATION $$T_{xy} = \begin{bmatrix} 1 & T_x \\ T_y & 1 \end{bmatrix}$$

SCALING $$S = \begin{bmatrix} S_x & o \\ o & S_y \end{bmatrix}$$

It is also possible to identify such as:
a. Equal-gradient-Direction-Angle Subspace where:

$$\frac{\nabla y}{\nabla x} = CONST.$$

b. Equal-gradient-Magnitude Subspace where:

$$((\nabla x)^2 + (\nabla y)^2) = CONST.$$

c. Dominant-Magnitude Subspace wherein a gradient has a maximum value.

Continuing, to provide insight as to calculation of MEAN "X", MEAN "Y" and a PARM, it is first noted that in the Disclosure Of The Invention Section herein it was established that the invention method, as applied to data images and data structures, includes such as:

"determining Eigenvalues for essentially the entire data structure, said Eigenvalues being a major axis and (N−1) minor axes of a characteristic virtual data structure mathematical object, then calculating a first non-degenerate data structure index element using a formula which operates on said major axis and at least one of said (N−1) minor axes"; or "determining Eigenvalues for essentially the entire data image, said Eigenvalues being a major axis ($\lambda_{11}$) and a minor axis ($\lambda_{21}$) of a characteristic virtual ellipse"; or "dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses";

but to this point, this Disclosure has provided no insight as to how said determination of Mean and Eigenvalues are accomplished. In the following a demonstrative two dimensional data image is assumed and a preferred method of determining Eigenvalues, comprising a major and a minor axis of a "data image characterizing virtual ellipse", is presented to provide further insight.

To begin, the basic present invention, methodology is best understood by referral to FIG. 1 which shows a data image of an airplane and indicates three levels (L1), (L2) and (L3) of data image division, (the reason for which will become clear later herein). FIG. 2a shows an ellipse with a major axis ($\lambda_{11}$) and a minor axis ($\lambda_{21}$). At this point it is disclosed that the mathematical technique presented directly, operating an the image in level (L1) of FIG. 1, provides values for said FIG. 2a ellipse major axis ($\lambda_{11}$) and a minor axis ($\lambda_{21}$). Likewise application of the disclosed that the mathematical technique presented directly, independently operating on the each of the images in level (L2) of FIG. 1, provides values for said FIG. 2b1 ellipse major axis ($\lambda_{12}$) and a minor axis ($\lambda_{22}$) for said FIG. 2b2 ellipse major axis ($\lambda_{13}$) and a minor axis ($\lambda_{23}$). Likewise application of the disclosed that the mathematical technique presented directly, independently operating on the images in level (L3) of FIG. 1, provides values for said FIG. 2c1 ellipse major axis ($\lambda_{14}$) and a minor axis ($\lambda_{24}$), for said FIG. 2c2 ellipse major axis ($\lambda_{15}$) and a minor axis ($\lambda_{25}$), for said FIG. 2c3 ellipse major axis ($\lambda 16$) and a minor axis ($\lambda_{26}$) for said FIG. 2c4 ellipse major axis ($\lambda_{17}$) and a minor axis ($\lambda_{27}$).

At this point it is noted that within the present invention methodology, the FIG. 1 images at level (L2), are arrived at by division of the FIG. 1 image at level (L1) about the minor axis of the ellipse shown in FIG. 2a. As well, the images in the third level (L3) in FIG. 1, are arrived at by dividing the data in level (l2) therein around the minor axes in the FIGS. 2b1 and 2b2 ellipses. It is also noted at this point that practice of the method of the present invention usually does not involve actually plotting the ellipses shown in FIGS. 2a–2c4, and that is why the terminology "virtual ellipse" is often utilized in this Disclosure.

The mathematical technique involved in determining Eigenvalue major ($\lambda_{11}$) and minor ($\lambda_{21}$) axes values will be demonstrated for the FIG. 1, Level (L1), and it is to be understood that the same technique applies at levels (L2) and (L3), with the difference being that only portions of the data image are involved at said (L2) and (L3) levels.

first, the data image is considered to be a two dimensional array of pixels, each of said pixels being located by "x" and "y" position indicators, and having associated therewith a magnitude which is arrived at by application of a formula which operates on intensity, and optionally, color content, (eg. Red, Blue and Green percentages). Now, given a two dimensional continuous function f(x,y), the central moment of order (p+q) is defined, (in Chapter 7 of "Computer Image Processing and Recognition", by Hall, Academic Press), as:

$$m_{pq} = \int_{-\infty}^{\infty}\int_{-\infty}^{\infty} x^p y^q f(x,y)\,dxdy \quad p, q = 1, 2, \ldots$$

Continuing, a uniqueness theorem states that if f(x,y) is piecewise continuous and has nonzero values in a finite part of the x-y plane, then central moments of all orders exist and the central moment sequence $m_{pq}$ is uniquely determined by f(x,y). Conversely, $m_{pq}$ uniquely recovers f(x,y). It is noted that this condition is generally satisfied by a digital image. Now, the central moment of order (p+q) is expressed as:

$$\mu_{pq} = \int_{-\infty}^{\infty}\int_{-\infty}^{\infty} (x-\bar{x})^p(y-\bar{y})^q f(x,y)\,dx\,dy; \quad p,q=0,1,2,\ldots$$

where:

$$\bar{x} = \frac{m10}{m00}; \quad \bar{y} = \frac{m01}{m00}$$

are the centroids. For a digital image the above equations become:

$$m_{pq} = \sum_x \sum_y (x)^p(y)^q f(x,y)\,dx\,dy;$$

$$\mu_{pq} = \sum_x \sum_y (x-\bar{x})^p(y-\bar{y})^q f(x,y)\,dx\,dy;$$

Further, it is known that the $u_{pq}$ is invariant under translation. That is:

$$\mu_{pq}(x,y) = \mu_{pq}(x-x_o, y-y_0)$$

However, $u_{pq}$ is scaling and rotation dependent.

The second central moments of an image function f(x,y) are central moments of inertia and are analogous to variances and covariance of a bivariant probability distribution. The 2×2 matrix formed by them being:

$$\Sigma = \begin{bmatrix} \mu_{20} & \mu_{11} \\ \mu_{11} & \mu_{02} \end{bmatrix}$$

is real symetric. The Eigenvalues are solutions to the characteristic equation:

$$|\Sigma - \lambda I| = 0$$

The Eigenvector $\phi_i$ corresponding to Eigenvalue $\lambda_i$ is given by:

$$(\Sigma - \lambda I)\phi_i = 0$$

Since $\Sigma$ is real symetric, the Eigenvectors corresponding to two different Eigenvalues are typically orthogonal. The Eigenvalues of the above central moments are invariant under rotation of the image function f(x,y), but are still scaling dependent. One way to make them scaling invariant is by normalization, such as:

$$\lambda_1/\sqrt{\lambda_{12}^2 + \lambda_{22}^2}$$

or taking the ratio:

$$\lambda_1/\lambda_2$$

Another way is to use the normalized second central moments denoted as $n_{pq}$;

$$n_{pq} = \frac{\mu_{pq}}{r\mu_{00}}, \text{ where } r = \frac{(p+q)}{2} + 1; \text{ for } p+q=2,3,\ldots$$

Said Eigenvalues and Eigenvectors have important properties:
1. The Eigenvalue matrix is invariant under typically orthogonal linear transformations; and
2. The Eigenvector corresponding to the largest Eigenvalue points to the direction with the largest changes of the object image, ie. the longest cross expansion of the 2D shape.

Therefore an Eigenvector of the second central moments passing through the centroid of f(x,y) gives a unique partition or the object image. The resulting subdivisions are independent of the position, scaling and orientation changes of the objects in the image. It is noted that by use of a 3×3 normalized second central moment matrix the described scheme application can be expanded to a 3D data structure.

It is to be appreciated that Eigenvalues derived from normalized second central moments:

$$\lambda_1 = \tfrac{1}{2}((n_{20}+n_{02}) + \sqrt{(n_{20}+n_{02})^2 + 4n_{11}^2})$$

$$\lambda_2 = \tfrac{1}{2}((n_{20}+n_{02}) + \sqrt{(n_{20}+n_{02})^2 + 4n_{11}^2})$$

are invariant under geometric transformations of the image function f(x,y). Further, the description of a 2D shape by central moment invariants defined on the second central moments can be viewed as an elliptic approximation of the shape, as described in "Image Analysis Via the General Theory Of central moments", Teague, J. Opt. Soc. America, Vol. 70, No. 8, (August 1980). That is, for an image defined by $$f(x,y) = \begin{cases} 1 & \frac{x^2}{a^2} + \frac{y^2}{b^2} \le 1 \\ 0 & \end{cases}$$

the Eigenvalues:

$$\lambda_1 = 1/a^2 \quad \lambda_2 = 1/b^2$$

are the major ($\lambda_1$) and minor ($\lambda_2$) axis of the so defined ellipse. The descriptors ($\lambda_1$) and ($\lambda_2$) modulate the shape of the ellipse, and Eigenvalues of the second central moments of the image function f(x,y) uniquely determines an elliptic approximation of the object shape.

The described shape descriptors ($\lambda_1$) and ($\lambda_2$) can be acquired at various data depth levels such as demonstrated by (L1) (L2) and (L3) in FIG. 1.

The foregoing mathematical derivation is presented in "A Transformation-Invariant Recursive Subdivision Method For Shape Analysis", Zhu and Poh, IEEE Proc. of the 9th Int. Conf. on Pattern Recog., Rome, Italy, (Nov. 14–17, 1988).

Further, it is noted that in calculation of the Eigenvalues. ($\lambda_1$) and ($\lambda_2$) it is possible to find:

$$\bar{x} = m_{10}/m_{00}$$

$$\bar{y} = m_{01}/m_{00}$$

then for p, q = 0, 1, 2 . . . determining $$u_{pq} = \sum_x \sum_y (x-\bar{x})^p(y-\bar{y})^q f(x,y); \text{ for } p,q=0,1,2,\ldots$$

to the end that $n_{pq} = \mu_{pq}/\mu_{00}^y$ is calculatable, where y=(p+q)/2+1, for p+q=2, 3 . . .
followed by calculation of:

$$\lambda_{11} = m_{11} - \bar{x}m_{01};$$

$$\lambda_{20} = m_{20} - \bar{x}m_{10}; \text{ and}$$

$$\lambda_{02} = m_{02} - \bar{y}m_{01};$$

and then determine:

$n_{11} = \mu_{11}/m_{00}^2$;

$n_{20} = \mu_{20}/m_{00}^2$; and $n_{02} = \mu_{02}/m_{00}^2$;

where $m_{00} = \mu_{00}$;

to provide entries for calculating $(\lambda_1)$ and $(\lambda_2)$ by equations presented earlier herein.

New in the present invention methodology is use of the described shape descriptors, generally represented by $(\lambda_1)$ and $(\lambda_2)$ found from application of the just recited technique to various portions of the image data at various levels (L1), (L2) (L3) etc., to form a plurality of Non-degenerate Index Elements, (I1), (I2) (3) etc. which plurality of Non-degenerate Index Elements are then concatenated in any functional permuted order to form a data image identifying Index (I) which is descriptive of the data image. It is to be appreciated that said identifying Index (I) not only characterizes a data image, but also can be easily stored and retrieved by conventional computer programming techniques.

As presented earlier in this Disclosure in specific forms, a preferred, but not exclusive, general formulation for producing Non-degenerate Index Elements is:

$$I = \frac{(\lambda_1 - \lambda_2)^2}{\lambda_1 + \lambda_2}$$

Again, the prefered present invention methodology for calculating values for MEAN "X", MEAN "Y" and a PARM, provides that:

a. only pixels identified by application of gradient testing by formulas such as:

$\nabla x = f(x,y) - f(x+1,y)$;

$\nabla y = f(x,y) - f(x,y+1)$)

are utilized in the central moment calculations, and that b. typically, only one heirarchial data structure level will be involved. That is, while, not a limitation, it is typical practice to calculate, values for MEAN "X", MEAN "Y", and a PARM only once, without continuation to application of the central moment calculations to additional heiarchial levels in a data strturcture, (as demonstrated by FIGS. 2b1 and 2b2, and 2c1–2c4.

FIG. 4 shows the a flow for a basic present invention method. Said method involves calculating Eigenvalues for an N dimensional data set, then dividing said N dimensional data set into first and second data sets and calculating Eigenvalues for each. Arrows exiting the first and second blocks indicate that additional steps, such as utilizing said Eigenvalues to determine and Index comprised of Index Elements can be performed after practice of the methodology therein. FIG. 4 also shows that an additional step of comparing a calculated Index to previously determined Data Set Image Indicies.

Figure 5:
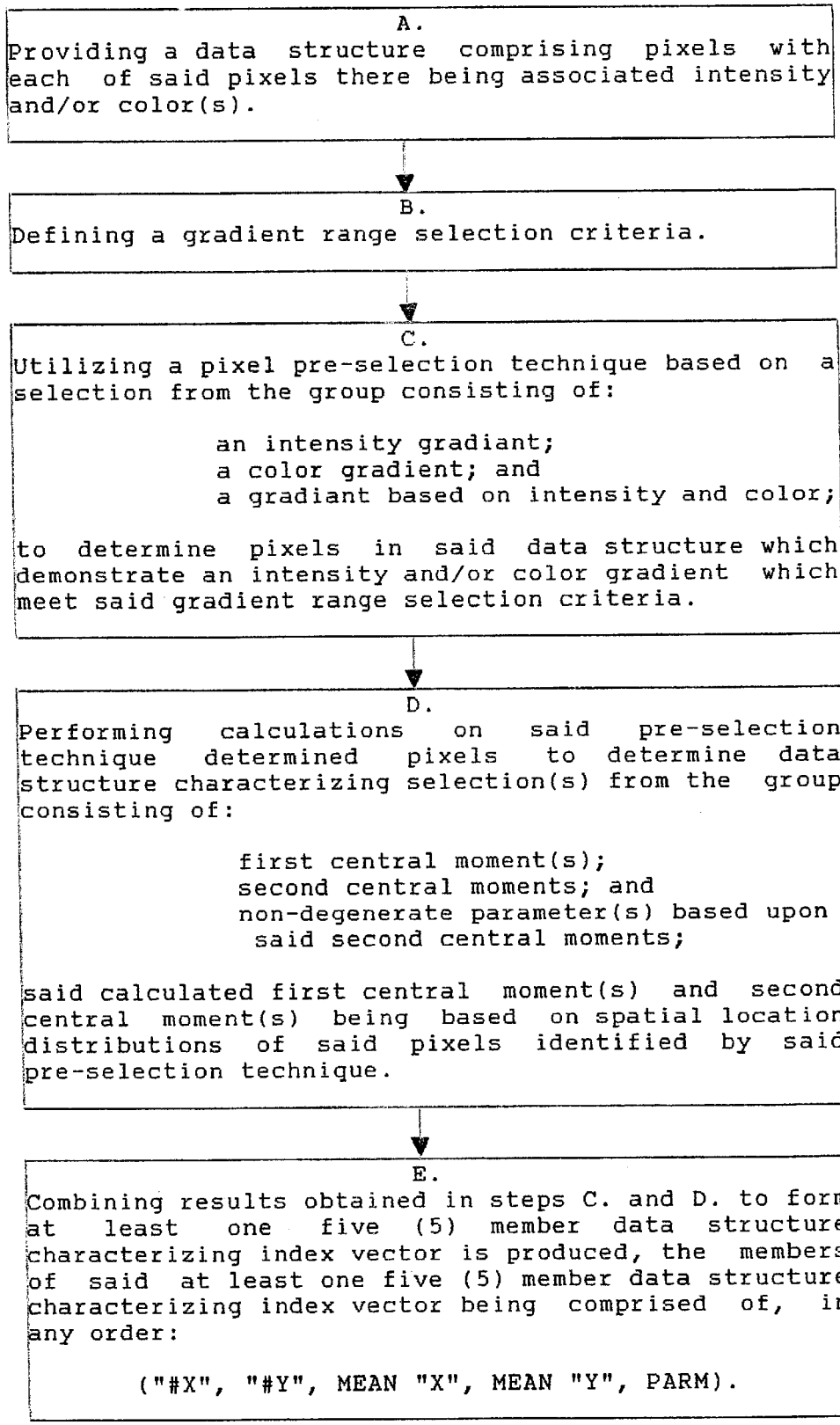
FIG. 5 shows the basic flow of a prefered present invention method.

FIG. 5 shows the basic flow of a non-limiting preferred present invention method. Included is Data Set Pixel preselection.

The present invention then is methodology for enabling easy characterization, storage and retrieval of multi-dimensional data structures involving use of a translation, rotation and scaling invariant index which results from concatenating a series of Eigenvalue calculation mediated index elements determined at a plurality of hierarchical data depth levels.

It is noted that the present invention methodology can be practiced on any computing system capable with sufficient read-in, memory, calculating and read-out capability.

It should also be appreciated that the present invention provides a convenient method for comparing the content of two or more data structures, via comparison of corresponding Non-degenerate Index Elements arrived at by practice of the described method. This is especially applicable in comparison of, for instance, medical data images corresponding to a subject and to archieved medical reference images which are, in a practical sense, unidentifiable, hence, unretrievable, in the absence of the methodology present invention.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A method of providing an identifying data image index (I) for a two dimensional data image consisting of a multiplicity of pixels, said method comprising the steps of:

a. applying a pixel pre-selection criteria to eliminate pixels not associated with image feature edges;

b. determining Eigenvalues for essentially the entire remaining data image, said Eigenvalues being a major axis $(\lambda_{11})$ and a minor axis $(\lambda_{21})$ of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

c. dividing said essentially entire two dimensional data image into first and second data image parts about an axis selected from the group consisting of:
said minor axis;
said major axis; and
an axis intermediate thereto;
and for at least one of said first and second data image parts independently determining Eigenvalues therefore, said Eigenvalues being a major axis $(\lambda_{12})$ and a minor axis $(\lambda_{22})$ for the first of said separate characteristic virtual ellipses, and major axis $(\lambda_{13})$ and a minor axis $(\lambda_{23})$ for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

d. concatenating at least two of said determined first, second and third non-degenerate data image index elements in any functional permuted order to provide said identifying data image index (I).

2. A method of developing an image comprising the steps of:

a. providing an identifying data image index (I) as determined in claim 1;

b. converting each data index element into an array of pixils; and c. combining the resulting pixels.

3. A method of providing an identifying data image index (I) for a two dimensional data image consisting of a multiplicity of pixels, said method comprising the steps of:

a. determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues;

b. dividing said essentially entire two dimensional data image into at least first and second data image parts about an axis selected from the group consisting of:
said minor axis;
said major axis; and
an axis intermediate thereto;
and for each of said at least first and second data image parts independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result;

c. concatenating at least two of said first (I1), second (I2) and/or third (3) non-degenerate data image index elements in any functional permuted order to provide said identifying data image index (I).

4. A method of providing an identifying data image index (I) for a two dimensional data image consisting of a multiplicity of pixels as in claim 3, wherein a pre-selection criteria is applied to eliminate pixels not associated with image feature edges.

5. A method of developing an image comprising the steps of:
a. providing an identifying data image index (I) as determined in claim 4;
b. converting each data index element into an array of pixils; and
c. combining the resulting pixels.

6. A method of providing an identifying data image index (I) for a two dimensional data image consisting of a multiplicity of pixels, comprising the steps of:

a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of:
said minor axis;
said major axis; and
an axis intermediate thereto;
and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. dividing said each of said first and second image parts from step b., each about an axis selected from the group consisting of:
said minor axis;
said major axis; and
an axis intermediate thereto;
to produce third, forth, fifth and sixth image parts and for at least one of said third, forth, fifth and sixth image parts independently determining Eigenvalues thereof, said determined Eigenvalues being selected from the group consisting of:
a major axis ($\lambda_{14}$) and a minor axis ($\lambda_{24}$) for the third of said separate characteristic virtual ellipses, and major axis ($\lambda_{15}$) and a minor axis ($\lambda_{25}$) for the forth of said separate characteristic virtual ellipses, a major axis ($\lambda_{16}$) and a minor axis ($\lambda_{26}$) for the fifth of said separate characteristic virtual ellipses, and major axis ($\lambda_{17}$) and a minor axis ($\lambda_{27}$) for the sixth of said separate characteristic virtual ellipses, and then calculating forth (I4), fifth (I5), sixth (I6) and seventh (I7) non-degenerate data image index elements using as appropriate the formulas:

$$I_4 = \frac{(\lambda_{14} - \lambda_{24})^2}{\lambda_{14} + \lambda_{24}} \quad I_5 = \frac{(\lambda_{15} - \lambda_{25})^2}{\lambda_{15} + \lambda_{25}}$$

$$I_6 = \frac{(\lambda_{16} - \lambda_{26})^2}{\lambda_{16} + \lambda_{26}} \quad I_7 = \frac{(\lambda_{17} - \lambda_{27})^2}{\lambda_{17} + \lambda_{27}}$$

d. concatenating said first (I1), and at least one produced non-degenerate data index element(s) selected from the group consisting of said:
second (I2), third (I3), forth (I4), fifth, (I5), sixth (I6) and seventh (I7) non-degenerate data index elements;
in any functional permuted order, to provide said identifying data image index (I).

7. A method of providing an identifying data image index (I) for a two dimensional data image consisting of a multiplicity of pixels as in claim 6, in which a pre-selection criteria is applied to eliminate pixels in the data set which are not associated with image feature edges.

8. A method of developing an image, comprising the steps of:
a. providing an identifying data image index (I) as determined in claim 7;
b. converting each data index element into an array of pixils; and
c. combining the resulting pixels.

9. A method of developing an image comprising the steps of:
a. providing an identifying data image index (I) as determined in claim 6;
b. converting each data index element into an array of pixils; and
c. combining the resulting pixels.

10. A method of providing an identifying data image index (I) for a two dimensional data image consisting of a multiplicity of pixels, said method comprising the defining of a gradient range selection criteria based on a selection from the group consisting of:
- an intensity gradiant;
- a color gradient; and
- a gradiant based on intensity and color;

and pre-selecting pixels within a selected range of gradients in said two dimensional data set based upon the meeting of said intensity and/or color gradient determining pre-selection criteria;

said method further comprising the steps of:

a. determining Eigenvalues for pre-selected pixels in essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of:
- said minor axis;
- said major axis; and
- an axis intermediate thereto;

and for pre-selected pixels in each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. concatenating said first, second and third non-degenerate data image index elements to provide said identifying data image index (I) by a selection from the group consisting of:
- I=I1 I2 I3;
- I=I1 I3 I2;
- I=I2 I1 I3;
- I=I2 I3 I1;
- I=I3 I1 I2; and
- I=I3 I2 I1.

11. A method of providing an identifying index (I) for a two dimensional image consisting of a multiplicity of pixels as in claim 10, in which the step of determining Eigenvalues for pre-selected pixels in essentially the entire image, said Eigenvalues being a major axis ($\lambda_{11}$) and a minor axis ($\lambda_{21}$) of a characteristic virtual ellipse involves:

for a multiplicity of pre selected pixels f(x,y), determining central moments of order (p+q) for p, q=0, 1, 2 . . . where $$m_{pq} = \sum_x \sum_y (x)^p (y)^q f(x, y)\, dxdy;$$

to the end that x=m10/m00 and y=m01/m00 are calculated, then for p, q=0, 1, 2 . . . determining $$\mu_{pq} = \sum_x \sum_y (x-\bar{x})^p (y-\bar{y})^q f(x, y)\, dxdy;$$

to the end that $n_{pq}=\mu_{pq}/\mu_{00}^y$ is calculatable, where y=(p+q)/2+1, for p+q=2, 3 . . .

followed by calculation of:

$$\mu_{11} = m_{11} - \bar{x}m_{01};$$

$$\mu_{20} = m_{20} - \bar{x}m_{10}; \text{ and}$$

$$\mu_{02} = m_{02} - \bar{y}m_{01}$$

and then:

$$n_{11} = \mu_{11}/m_{00}^2;$$

$$n_{20} = \mu_{20}/m_{00}^2; \text{ and}$$

$$n_{02} = \mu_{02}/m_{00}^2;$$

where $m_{00} = \mu_{00}$;

followed by calculation of:

$$\lambda_1 = \tfrac{1}{2}((n_{20}+n_{02}) + \sqrt{(n_{20}+n_{02})^2 + 4n_{11}^2})$$

$$\lambda_2 = \tfrac{1}{2}((n_{20}+n_{02}) + \sqrt{(n_{20}+n_{02})^2 + 4n_{11}^2}).$$

12. A method of developing an image comprising the steps of:

a. providing an identifying two dimensional data image index (I) as determined in claim 11;

b. converting each data index element into an array of pixils; and c. combining the resulting pixels.

13. A method of developing an image comprising the steps of:

a. providing an identifying data image index (I) as determined in claim 10;

b. converting each data index element into an array of pixils; and c. combining the resulting pixels.

14. A method of providing an identifying data image index (I) for a two dimensional data image consisting of a multiplicity of pixels, said method comprising the defining of a gradient range selection criteria based on a selection from the group consisting of:
- an intensity gradiant;
- a color gradient; and
- a gradiant based on intensity and color;

and pre-selecting pixels within a selected range of gradients in said two dimensional data set based upon the meeting of said intensity and/or color gradient determining pre-selection criteria;

said method comprising the steps of:

a. determining Eigenvalues for pre-selected pixels in essentially the entire data image, said Eigenvalues being a major axis and: a minor axis of a characteristic virtual ellipse, then calculating a first (I1) non-degenerate data image index element using a formula which operates on said major and minor axes Eigenvalues.

15. A method of providing an identifying data image index (I) for a two dimensional data image consisting of a multiplicity of pixels as in claim 14, said method further comprising the steps of:

b. dividing said essentially entire two dimensional data image into at least first and second data image parts about an axis selected from the group consisting of:
said minor axis;
said major axis; and
an axis intermediate thereto;
and for pre-selected pixels in each of said at least first and second data image parts independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result.

16. A method of providing an identifying data image index (I) for a two dimensional data image consisting of a multiplicity of pixels as in claim 15, said method further comprising the step of:

c. concatenating at least two of said first (I1), second (I2) and/or third (3) non-degenerate data image index elements in any functional permuted order to provide said identifying data image index (I).

17. A method of developing an image comprising the steps of:
a. providing an identifying data image index (I) as determined in claim 16;
b. converting each data index element into an array of pixils; and
c. combining the resulting pixels.

18. A method of developing an image comprising the steps of:
a. providing an identifying data image index (I) as determined in claim 15;
b. converting each data index element into an array of pixils; and
c. combining the resulting pixels.

19. A method of developing an image comprising the steps of:
a. providing an identifying data image index (I) as determined in claim 14;
b. converting each data index element into an array of pixils; and
c. combining the resulting pixels.

20. A method of providing an identifying data structure index (I) for an "N" dimensional data structure consisting of a multiplicity of pixels, said method comprising the defining of a gradient range selection criteria based on a selection from the group consisting of:
an intensity gradiant;
a color gradient; and
a gradiant based on intensity and color;
and pre-selecting pixels within a selected range of gradients in said "N" dimensional data set based upon the meeting of said intensity and/or color gradient determining pre-selection criteria;
said method comprising the step of:

a. determining Eigenvalues for pre-selected pixels in essentially the entire data structure, said Eigenvalues being a major axis and (N−1) minor axes of a characteristic virtual data structure mathematical object, then calculating a first non-degenerate data structure index element using a formula which operates on said major axis and at least one of said (N−1) minor axes.

21. A method of providing an identifying data Structure index (I) for an "N" dimensional data structure consisting of a multiplicity of pixels as in claim 20, said method further comprising the step of:

b. dividing said essentially entire "N" dimensional data structure into at least first and second data structure parts about at least one axis selected from the group consisting of:
said major axis;
said (N−1) minor axes; and
axis intermeidate thereto;
and for pre-selected pixels in at least one of said at least first and second data structure parts independently determining "N" Eigenvalues therefore, said "N" Eigenvalues being a major axis and (N−1) minor axes of a mathematical object for said at least one of said at least first and second data structure parts, and then calculating at least one additional non-degenerate data structure index element using formula(s) which operate on said major axis and at least one of said (N−1) minor axes in said at least one of said at least first and second data structure parts, and return a non-degenerate result.

22. A method of providing an identifying data structure index (I) for an "N" dimensional data structure consisting of a multiplicity of pixels as in claim 21, said method further comprising the step of:

c. concatenating at least two resulting non-degenerate data structure index elements in any functional permuted order to provide said identifying data structure index (I).

23. A method of developing an image comprising the steps of:
a. providing an identifying data image index (I) as determined in claim 22;
b. converting each data index element into a structure of pixils; and
c. combining the resulting pixels.

24. A method of developing a data structure comprising the steps of:
a. method of providing an identifying data structure index (I) as determined in claim 21;
b. converting each data index element into a structure of pixils; and
c. combining the resulting pixels.

25. A method of developing a data structure comprising the steps of:
a. method of providing an identifying data structure index (I) as determined in claim 21;
b. converting each data index element into an array of pixils; and
c. combining the resulting pixels.

26. A method of developing a data structure comprising the steps of:

a. method of providing an identifying data structure index (I) as determined in claim 20;
b. converting each data index element into a structure of pixils; and
c. combining the resulting pixels.

27. A method of providing an identifying data image, index (I) for a two dimensional data image consisting of a multiplicity of pixels, said method comprising the defining of a gradient range selection criteria based on a selection from the group consisting of:
an intensity gradiant;
a color gradient; and
a gradiant based on intensity and color;
and pre-selecting pixels within a selected range of gradients in said two dimensional data set based upon the meeting of said intensity and/or color gradient determining pre-selection criteria;
said method further comprising the steps of:
a. determining Eigenvalues for pre-selected pixels in essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of:
said minor axis;
said major axis; and
an axis intermediate thereto;
and for pre-selected pixels in each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}} \quad I_3 = \frac{(\lambda_{13} - \lambda_{23})^2}{\lambda_{13} + \lambda_{23}}$$

c. dividing said each of said first and second image parts from step b., each about an axis selected from the group consisting of:
said minor axis;
said major axis thereof; and
an axis intermeidate thereto;
to produce third, forth, fifth and sixth image parts and for at least one of said third, forth, fifth and sixth image parts, based upon pre-selected pixels therein, independently determining Eigenvalues thereof, said determined Eigenvalues being selected from the group consisting of:
a major axis ($\lambda_{14}$) and a minor axis ($\lambda_{24}$) for the third of said separate characteristic virtual ellipses, and major axis ($\lambda_{15}$) and a minor axis ($\lambda_{25}$) for the forth of said separate characteristic virtual ellipses, a major axis ($\lambda_{16}$) and a minor axis ($\lambda_{26}$) for the fifth of said separate characteristic virtual ellipses, and major axis ($\lambda_{17}$) and a minor axis ($\lambda_{27}$) for the sixth of said separate characteristic virtual ellipses, and then calculating forth (I4), fifth (I5), sixth (I6) and seventh (I7) non-degenerate data image index elements using as appropriate the formulas:

$$I_4 = \frac{(\lambda_{14} - \lambda_{24})^2}{\lambda_{14} + \lambda_{24}} \quad I_5 = \frac{(\lambda_{15} - \lambda_{25})^2}{\lambda_{15} + \lambda_{25}}$$

$$I_6 = \frac{(\lambda_{16} - \lambda_{26})^2}{\lambda_{16} + \lambda_{26}} \quad I_7 = \frac{(\lambda_{17} - \lambda_{27})^2}{\lambda_{17} + \lambda_{27}}$$

d. concatenating said first (I1), and at least one produced non-degenerate data index element(s) selected from the group consisting of said:
second (I2); third (I3); forth (I4); fifth (I5); sixth (I6); and seventh (I7);
non-degenerate data index elements), in any functional permuted order, to provide said identifying data image index (I).

28. A method of providing an identifying data image index (I) for a two dimensional data image consisting of a multiplicity of pixels as in claim 27, in which, in steps c. and d. thereof, all of said first (I1), second (I2), third (I3), forth (I4), fifth (I5), sixth (I6) and seventh (I7) non-degenerate data index elements, are calculated and concatenated, in any functional permuted order, to provide said identifying data image index (I).

29. A method of developing an image comprising the steps of:
a. providing an identifying data image index (I) as determined in claim 28;
b. converting each data index element into an array of pixils; and
c. combining the resulting pixels.

30. A method of developing an image comprising the steps of:
a. providing an identifying data image index (I) as determined in claim 27;
b. converting each data index element into an array of pixils; and
c. combining the resulting pixels.

31. A method of providing an identifying data image index (I) for a two dimensional data image consisting of a multicity of pixels, said method comprising the defining of a gradient range selection criteria based on a selection from the group consisting of:
an intensity gradiant;
a color gradiant; and
a gradiant based on intensity and color;
and pre-selecting pixels within a selected range of gradients in said two dimensional data set based upon the meeting of said intensity and/or color gradient determining pre-selection criteria;
said method further comprising the steps of:
a. determining Eigenvalues for pre-selected pixels in essentially the entire data image, said Eigenvalues being a major axis ($\lambda_{11}$) and a minor axis ($\lambda_{21}$) of a characteristic virtual ellipse, then calculating a first (I1) non-degenerate data image index element using a formula which operates on said Eigenvalues:
b. dividing said essentially entire two dimensional data image into first, second, third and forth data image parts using said minor axis and said major axis as dividing means, said first, second, third and forth data image parts being oriented in a first, second, third and forth gradiant pattern defined by said major and minor axes, in said two dimensional data image;

c. for at least one of said first, second, third and forth data image parts, based upon pre-selected pixels therein, independently determining Eigenvalues of a characteristic virtual ellipse therefore, said Eigenvalues being selected from the group consisting of:

a major axis ($\lambda_{12}$) and a minor axis ($\lambda_{22}$) for the first of said separate characteristic virtual ellipses; and a major axis ($\lambda_{13}$) and a minor axis ($\lambda_{23}$) for the second of said separate characteristic virtual ellipses; a major axis ($\lambda_{14}$) and a minor axis ($\lambda_{24}$) for the third of said separate characteristic virtual ellipses and a major axis ($\lambda_{15}$) and a minor axis ($\lambda_{25}$) for the forth of said separate characteristic virtual ellipses;

d. calculating at least one additional non-degenerate data image image index element using formula(s) which operates on Eigenvalues corresponding to said at least one of said first, second, third and forth data image parts determined in step. c; and e. concatenating at least two resulting non-degenerate data index elements, in any functional permuted order, to provide said identifying data image index (I).

32. A method of providing an:identifying data image index (I) for a two dimensional data image consisting of a multiplicity of pixels as in claim 31, wherein Eigenvalues for each of said first, second, third and forth data image parts are independently determined, said Eigenvalues being:

a major axis ($\lambda_{12}$) and a minor axis ($\lambda_{22}$) for the first of said separate characteristic virtual ellipses; and a major axis ($\lambda_{13}$) and a minor axis ($\lambda_{23}$) for the second of said separate characteristic virtual ellipses; a major axis ($\lambda_{14}$) and a minor axis ($\lambda_{24}$) for the third of said separate characteristic virtual ellipses;

and a major axis ($\lambda_{15}$) and a minor axis ($\lambda_{25}$) for the forth of said separate characteristic virtual ellipses;

and wherein step d. involves calculating four additional non-degenerate data image index element using formula(s) which operate on Eigenvalues corresponding to said first, second, third and forth data image parts determined in step. c; and e. concatenating said resulting five non-degenerate data index elements, in any functional permuted order, to provide said identifying data image index (I).

33. A method of providing an identifying data image index (I) for a two dimensional data image consisting of a multiplicity of pixels as in claim 32, which further comprises dividing said each of said first, second, third and forth data image parts from step b., each about at least one axis selected from the group consisting of:

said minor axis;

said major axis thereof; and an axis intermediate thereto;

to identify at least two, and possibly four, new data image parts in each of said first, second, third and forth data image parts; and for at least some of the new data image parts, based upon pre-selected pixels therein, determining Eigenvalues therefore, said Eigenvalues being a major axis and a minor axis for a characteristic virtual ellipse for said newly formed data image part(s); and concatenating at least some of the calculated non-degenerate data index elements, in any functional permuted order, to provide said identifying data image index (I).

34. A method of developing an image comprising the steps of:

a. providing an identifying data image index (I) as determined in claim 33;

b. converting each data index element into an array of pixils; and c. combining the resulting pixels.

35. A method of developing an image comprising the steps of:

a. providing an identifying data image index (I) as determined in claim 32;

b. converting each data index element into an array of pixils; and c. combining the resulting pixels.

36. A method of developing an image comprising the steps of:

a. providing an identifying data image index (I) as determined in claim 31;

b. converting each data index element into an array of pixils; and c. combining the resulting pixels.

* * * * *